(12) United States Patent
Solinsky

(10) Patent No.: US 7,389,208 B1
(45) Date of Patent: Jun. 17, 2008

(54) SYSTEM AND METHOD FOR DYNAMIC KNOWLEDGE CONSTRUCTION

(75) Inventor: James C. Solinsky, San Diego, CA (US)

(73) Assignee: Accord Solutions, Inc., San Diego, CA (US)

( * ) Notice: Subject to any disclaimer, the term of this patent is extended or adjusted under 35 U.S.C. 154(b) by 364 days.

(21) Appl. No.: 09/658,275

(22) Filed: Sep. 8, 2000

Related U.S. Application Data

(60) Provisional application No. 60/215,762, filed on Jun. 30, 2000.

(51) Int. Cl.
| | | |
|---|---|---|
| *G06F 7/60* | (2006.01) | |
| *G06F 15/18* | (2006.01) | |
| *G06G 7/00* | (2006.01) | |
| *G06N 3/02* | (2006.01) | |
| *G06K 9/00* | (2006.01) | |
| *G06K 9/62* | (2006.01) | |

(52) U.S. Cl. .............................. 703/2; 706/15; 706/17; 706/22; 706/41; 706/44; 382/115; 382/156

(58) Field of Classification Search .................. 706/17, 706/15, 33, 41, 44; 703/2; 382/115, 156
See application file for complete search history.

(56) References Cited

U.S. PATENT DOCUMENTS 3,970,992 A  7/1976  Boothroyd et al. ....... 340/172.5

(Continued)

OTHER PUBLICATIONS

American Heritage Dictionary of the English Language, 4th ed., © 2000 by the Houghton Mifflin Co. Definitions of "simultaneous", "synthesis", and "concurrent". http://dictionary.reference.com.*

(Continued)

*Primary Examiner*—Zoila Cabrera
*Assistant Examiner*—Juan Carlos Ochoa
(74) *Attorney, Agent, or Firm*—Nixon & Vanderhye, PC

(57) ABSTRACT

A system and method responsive to input stimuli is provided by incorporating a computer software program, hardware processing engine, or a specialized ASIC chip processor apparatus to capture concurrent inputs that are responsive to training stimulation, store a model representing a synthesis of the captured inputs, and use the stored model to generate outputs in response to real-world stimulation. Human user forced-choice approval/disapproval generated descriptions and decisions may be dynamically mapped with conventionally presented information and sensor and control data. The model mapping is stored into and out of a conventional mass storage device, such as is used in a relational database for use in generating a response to the stimuli. By accessing commonly stored mappings, the system can be incorporated into a mixture of multiple domains and disciplines of users and can create a common understanding of knowledge and design concept contained within it through mutual interaction, and subsequent automatic modifications to a common relational database. The system and method is applicable to conventional storage and presentation devices, making it easily incorporated into a variety of commercial products, utilizing current commercial human-machine interfaces (e.g. Human-Machine Interface graphical user interface, or Graphical User Interface) and current mass storage devices. The system uses N-dimensional descriptions of observations and concepts in an infinitely expandable space, embracing elements of human thought. This allows the user to tailor this system to control operation of automated devices and appliances to reflect the individual's wishes and desires as a dynamic representation and mapping of user descriptions and decisions with information, sensor data, and device controls.

59 Claims, 9 Drawing Sheets

U.S. PATENT DOCUMENTS

| | | | |
|---|---|---|---|
| 4,803,736 A * | 2/1989 | Grossberg et al. | 382/173 |
| 4,852,018 A * | 7/1989 | Grossberg et al. | 700/259 |
| 4,906,940 A | 3/1990 | Greene et al. | 382/16 |
| 5,040,214 A * | 8/1991 | Grossberg et al. | 704/240 |
| 5,278,751 A * | 1/1994 | Adiano et al. | 705/10 |
| 5,301,284 A * | 4/1994 | Estes et al. | 711/203 |
| 5,371,810 A * | 12/1994 | Vaidyanathan | 382/291 |
| 5,497,430 A * | 3/1996 | Sadovnik et al. | 382/156 |
| 5,506,580 A | 4/1996 | Whiting et al. | 341/51 |
| 5,548,755 A | 8/1996 | Leung et al. | 395/600 |
| 5,554,983 A * | 9/1996 | Kitamura et al. | 340/937 |
| 5,579,409 A * | 11/1996 | Vaidyanathan et al. | 382/203 |
| 5,586,218 A | 12/1996 | Allen | 395/10 |
| 5,675,746 A * | 10/1997 | Marshall | 705/35 |
| 5,701,400 A | 12/1997 | Amado | 395/76 |
| 5,712,960 A | 1/1998 | Chiopris et al. | 395/77 |
| 5,729,754 A * | 3/1998 | Estes | 712/15 |
| 5,757,287 A * | 5/1998 | Kitamura et al. | 340/937 |
| 5,768,421 A * | 6/1998 | Gaffin et al. | 382/209 |
| 5,768,586 A | 6/1998 | Zweben et al. | 395/653 |
| 5,774,878 A * | 6/1998 | Marshall | 705/36 R |
| 5,778,378 A | 7/1998 | Rubin | 707/103 |
| 5,787,186 A * | 7/1998 | Schroeder | 382/115 |
| 5,790,116 A | 8/1998 | Malone et al. | 345/335 |
| 5,794,001 A | 8/1998 | Malone et al. | 395/342 |
| 5,806,075 A | 9/1998 | Jain et al. | 707/201 |
| 5,832,205 A | 11/1998 | Kelly et al. | 395/182.16 |
| 5,859,930 A * | 1/1999 | Chase | 382/218 |
| 5,875,108 A | 2/1999 | Hoffberg et al. | 364/146 |
| 5,893,106 A | 4/1999 | Brobst et al. | 707/102 |
| 5,900,870 A | 5/1999 | Malone et al. | 345/333 |
| 5,905,855 A | 5/1999 | Klaiber et al. | 395/183.07 |
| 5,911,581 A | 6/1999 | Reynolds et al. | 434/236 |
| 5,915,252 A | 6/1999 | Misheski et al. | 707/103 |
| 5,920,644 A * | 7/1999 | Fujimoto et al. | 382/159 |
| 5,926,832 A | 7/1999 | Wing et al. | 711/141 |
| 5,936,860 A | 8/1999 | Arnold et al. | 364/468.01 |
| 5,953,707 A | 9/1999 | Huang et al. | 705/10 |
| 5,958,061 A | 9/1999 | Kelly et al. | 714/1 |
| 5,963,653 A * | 10/1999 | McNary et al. | 382/103 |
| 5,966,712 A | 10/1999 | Sabatini et al. | 707/104 |
| 5,970,482 A | 10/1999 | Pham et al. | 706/16 |
| 5,978,790 A | 11/1999 | Buneman et al. | 707/2 |
| 5,991,776 A | 11/1999 | Bennett et al. | 707/205 |
| 5,995,958 A | 11/1999 | Xu | 707/3 |
| 5,999,940 A | 12/1999 | Ranger | 707/103 |
| 6,002,865 A | 12/1999 | Thomsen | 392/600 |
| 6,003,024 A | 12/1999 | Bair et al. | 707/3 |
| 6,006,230 A | 12/1999 | Ludwig et al. | 707/10 |
| 6,009,199 A | 12/1999 | Ho | 382/224 |
| 6,011,908 A | 1/2000 | Wing et al. | 392/182.17 |
| 6,038,337 A * | 3/2000 | Lawrence et al. | 382/156 |
| 6,069,696 A * | 5/2000 | McQueen et al. | 356/326 |
| 6,073,115 A * | 6/2000 | Marshall | 705/35 |
| 6,108,004 A * | 8/2000 | Medl | 715/804 |
| 6,233,575 B1 * | 5/2001 | Agrawal et al. | 707/6 |
| 6,236,749 B1 * | 5/2001 | Satonaka et al. | 382/154 |
| 6,310,966 B1 * | 10/2001 | Dulude et al. | 382/115 |
| 6,400,996 B1 * | 6/2002 | Hoffberg et al. | 700/83 |
| 6,421,453 B1 | 7/2002 | Kanevsky et al. | 382/115 |
| 6,466,695 B1 * | 10/2002 | Potzsch et al. | 382/199 |
| 6,529,614 B1 * | 3/2003 | Chao et al. | 382/103 |
| 6,549,661 B1 * | 4/2003 | Mitsuyama et al. | 382/224 |
| 6,564,198 B1 * | 5/2003 | Narayan et al. | 706/60 |
| 6,625,317 B1 * | 9/2003 | Gaffin et al. | 382/209 |
| 6,629,097 B1 * | 9/2003 | Keith | 707/5 |
| 6,633,844 B1 * | 10/2003 | Verma et al. | 704/251 |
| 6,650,779 B2 * | 11/2003 | Vachtesvanos et al. | 382/228 |
| 6,724,931 B1 * | 4/2004 | Hsu | 382/155 |
| 6,778,970 B2 * | 8/2004 | Au | 706/55 |
| 6,836,773 B2 * | 12/2004 | Tamayo et al. | 707/6 |
| 6,871,287 B1 * | 3/2005 | Ellingson | 713/202 |
| 6,898,299 B1 * | 5/2005 | Brooks | 382/115 |
| 6,920,231 B1 * | 7/2005 | Griffin | 382/115 |
| 2003/0191627 A1 * | 10/2003 | Au | 704/9 |
| 2005/0157909 A1 * | 7/2005 | Griffin | 382/115 |

OTHER PUBLICATIONS

Eric W. Weisstein's MathWorld—A Wolfram Web Resource (© 1999 CRC Press LLC). Definition of "world line". http://mathworld.wolfram.com/WorldLine.html.*

Tanenbaum, A. "Structured Computer Organization". pp. 10-12. © 1984.*

Swets, D.L. et al. "Using Discriminant Elgenfeatures for Image Retrieval." IEEE Trans. on Pattern Analysis. Aug. 1996. vol. 18, Issue 8, pp. 831-836.*

Moghaddam, B. et al. "Probabilistic Visual Learning for Object Representation." IEEE Trans. on Pattern Analysis. Jul. 1997. vol. 19, Issue 7, pp. 696-710.*

Austin, James. "Rapid Learning with a Hybrid Neural Network". Neural Network World, No. 5, pp. 531-549. IDG Communications. 1993. ("Austin_045.pdf"). http://ftp.cs.york.ac.uk/arch/NeuralNetworks/publications/UnsortedByYear/045.pdf.*

Austin, James. "Rapid Learning with a Hybrid Neural Network". Neural Network World, No. 5, pp. 531-549. IDG Communications. 1993. ("Austin_005.pdf"). http://ftp.cs.york.ac.uk/arch/NeuralNetworks/publications/1993/005.pdf.*

The University of York Advanced Computer Architecture Group—Neural Networks—Research Papers. http://ftp.cs.york.ac.uk/arch/NeuralNetworks/references.*

Lienhardt, P. "Subdivisions of n-dimensional spaces, and n-dimensional generalized maps." Proc. of the 5th Annual Symposium on Computational Geometry. 1989. pp. 228-236.*

Anastasio, M. et al. "A General Technique for Smoothing Multi-Dimensional Datasets Utilizing Orthogonal Expansions and Lower Dimensional Smoothers." Proc. 1998 Int'l Conf. on Image Processing (ICIP '98). Oct. 1998. vol. 2, pp. 718-721.*

Anastasio, M. et al. "Multidimensional Smoothing Using Orthogonal Expansions." IEEE Signal Processing Letters. Apr. 1999. vol. 6, Issue 4, pp. 91-94.*

U.S. Appl. No. 09/658,276.

Mar. 12, 2003 Office Action in U.S. Appl. No. 09/658,276.

Booch, *Object-Oriented Analysis and Design*, Benjamin/Cummings Pub., Co., Redwood City, CA, 1994, pp. 3-79, 81-83, 97-104 and 155-157.

Coad, et al., *Object-Oriented Analysis*, Prentice-Hall Inc., Englewood Cliffs, NJ, 1991, pp. 30-55.

Fowler, et al., *UML Distilled—A Brief Guide to the Standard Object Modeling Language*, Addison-Wesley, Menlo Park, CA, 2000, pp. 49-58 and 79-89.

Rumbaugh, et al., *The Unified Modeling Language Reference Manual* Addison-Wesley, Menlo Park, CA, 1999, pp. 58-61, 165-169 and 307-311.

Booch, et al., *The Unified Modeling Language User Guide*, Addison-Wesley, Menlo Park, CA, 1999, pp. 4-11, 24-26, 50-51, 105-107, 195-200.

Li, *A Prolog Database System*, Department of Computer Science, Heriot-Watt University, Edinburgh, UK, 1984, pp. 1-43.

Dreyfus, Hubert and Stuart, *Why Computers May Never Think Like People*, Harvard Technology Review, Jan. 1986, pp. 44-61.

Nii, et al., *Signal-to-Symbol Transformation: HASP/SIAP Case Study*, AI Magazine, 1982, pp. 23-35.

Solinsky, *The Use of Expert Systems in Machine Vision Recognition*, Vision '86 Conference, Detroit, MI, Jun. 1986, pp. 4-139.

Solinsky, *A Generalized Image Enhancement for Machine Vision Architecture*, Ultratech-Vision West Conference, Long Beach, CA, Sep. 1986, 47-65.

Solinsky, *A Generalized Feature Extraction Approach*, Vision '87 Conference, Detroit, MI, Jun. 1987, pp. 57-79.

Solinsky, *Machine Vision Tutored Learning Using Artificial Neural Systems Classification*, Vision '88 Conference, Detroit, MI, Jun. 1988, pp. 1-13.

Solinsky, *An Artificial Intelligence Perspective on the Sonar Probelm—Recognition Control Strategy in A Relationship Data Base*, Rockwell International, Anaheim, CA, Oct. 1985, pp. 1-37.

Solinsky, *A Man/Machine Performance Model for Analyzing Sonar System Designs*, Rockwell International Anaheim, CA, Dec. 1986, pp. 1-63.

Solinsky, *Evaluating System Performance in Low False Alarm Rate Regimes*, Advanced Systems Division, Science Applications International Corporation, La Jolla, CA, Feb. 1992, pp. 1-9.

Solinsky, *A Method for Compact Information Characterization in a Finite, Discrete Data Set*, , Advanced Systems Division, Science Applications International Corporation, La Jolla, CA, Apr. 1993, pp. 1-4.

Solinsky, *Intelligent Information Systems—Evolutionary Computational Tools in An Information Computer*, Science Applications International Corporation White Paper, San Diego, CA, Feb. 1995, pp. 1-5.

Gelernter, *The Muse in the Machine—Computerizing the Poetry of Human Thought*, Free Press Division of MacMillan, Inc., New York, NY, 1994, pp. 16-26.

Murphy, et al., *Automated Model Correlator and Metamodel Building Environments*, Accord Solutions, Small Business Innovation Research Program, Department of Defense, Proposal A95-065, Jan. 1995, pp. 1-24.

*The Information Computer—An Intelligent Systems Component for Consistent Abstraction of Collaborator Experience*, Accord Solutions, Proposal 960101, 1996, pp. 1-25.

Solinsky, *The Information Computer*, Accord Solutions—briefing presented to McDonnell Douglas Corp., and Cubic Corp., 1995-1996, pp. 1-8.

Klir, et al., *Advances in Computers*, vol. 36, edited by Marshall C. Yovits, Academic Press, New York, NY, 1993, pp. 254-332.

Zadeh, *Fuzzy Sets*, Information and Control 8, Department of Electrical Engineering and Electronics Research Laboratory, University of California, Berkeley, 1965, pp. 338-353.

Shannon, *A Mathematical Theory of Communication*, The Bell Systems Technical Journal, vol. XXVII, Jul. 1948, pp. 379-423.

Hartley, *Transmission of Information*, The Bell Systems Technical Journal, Journal 1, 1928, pp. 535-563.

Zadeh, *Fuzzy Sets As a Basis for a Theory of Possibility*, The Bell Systems Technical Journal 1 (1), 1978, pp. 3-28.

Shafer, *A Mathematical Theory of Evidence*, Princeton University, Princeton, NJ, Jun. 1975, pp. 3-286.

Shafer, *Belief Functions and Possibility Measures*, Analysis of Fuzzy Information, vol. 1, edited by J.C. Bezedek, CRC Press, Boca Raton, FL, 1985, pp. 51-84.

Dempster, *Upper and Lower Probability Inferences Based on A Sample from A Finite Univariate Population*, Harvard University, a) Biometrika, 54, pp. 515-528, b) Annals of Mathematical Statistics, 38, pp. 325-339, 1967.

Eliot, *Ruling Neural Networks*, AI Expert, Feb. 1995, pp. 8-10.

Solinsky, et. al., *Higher-Order Statistical Applications in Acoustics with Reference to Nonlinearities in Chaos*, Third International Symposium on Signal Processing Applications (HOSSPA 92), Gold Coast, Queensland, Australia, 1992.

Solinsky, et al., *Signal Analysis Applications of Nonlinear Dynamics and Higher-Order Statistics*, SPIE, vol. 2037, Chaos/Dynamics, San Diego, CA, 1993, pp. 162-179.

Kendall, et al., *The Advanced Theory of Statistics*, vols. I-III, MacMillan Publishing Co., Inc., New York, 1997, pp. 82-89, pp. 1-5, pp. 292-298.

Solinsky, et al. *Neural-Network Performance Assessment in Sonar Applications*, IEEE Conference on Neural Nets in Ocean Engineering Applications, Washington, DC, Aug. 1991, pp. 1-12.

Lippmann, *An Introduction to Computing with Neural Nets*, IEEE Acoustics, Speech and Signal Processing Magazine, Apr. 1987, pp. 4-22.

Griffith, *Mathematical Neurobiology—An Introduction to the Mathematics of the Nervous System*, Chapter 8, Academic Press, New York, NY, 1971, pp. 132-147.

Solinsky, *Trispectrum Utilization in Higher Order Statistical Applications*, Proceedings of IEEE Conference on HOS, Grenoble, France, 1991. Also in *Higher Order Statistics*, J.L. Lacoume Editor, Elsevier Science, Ltd., Netherlands, 1992.

Churchland, et al., *The Computational Brain*, MIT Press, Cambridge, MA, 1992, pp. 1-478.

Lee, *Independent Component Analysis—Theory and Applications*, Computational Neurobiology Laboratory, The Salk Institute, La Jolla, CA, 1998, pp. 1-41.

\* cited by examiner

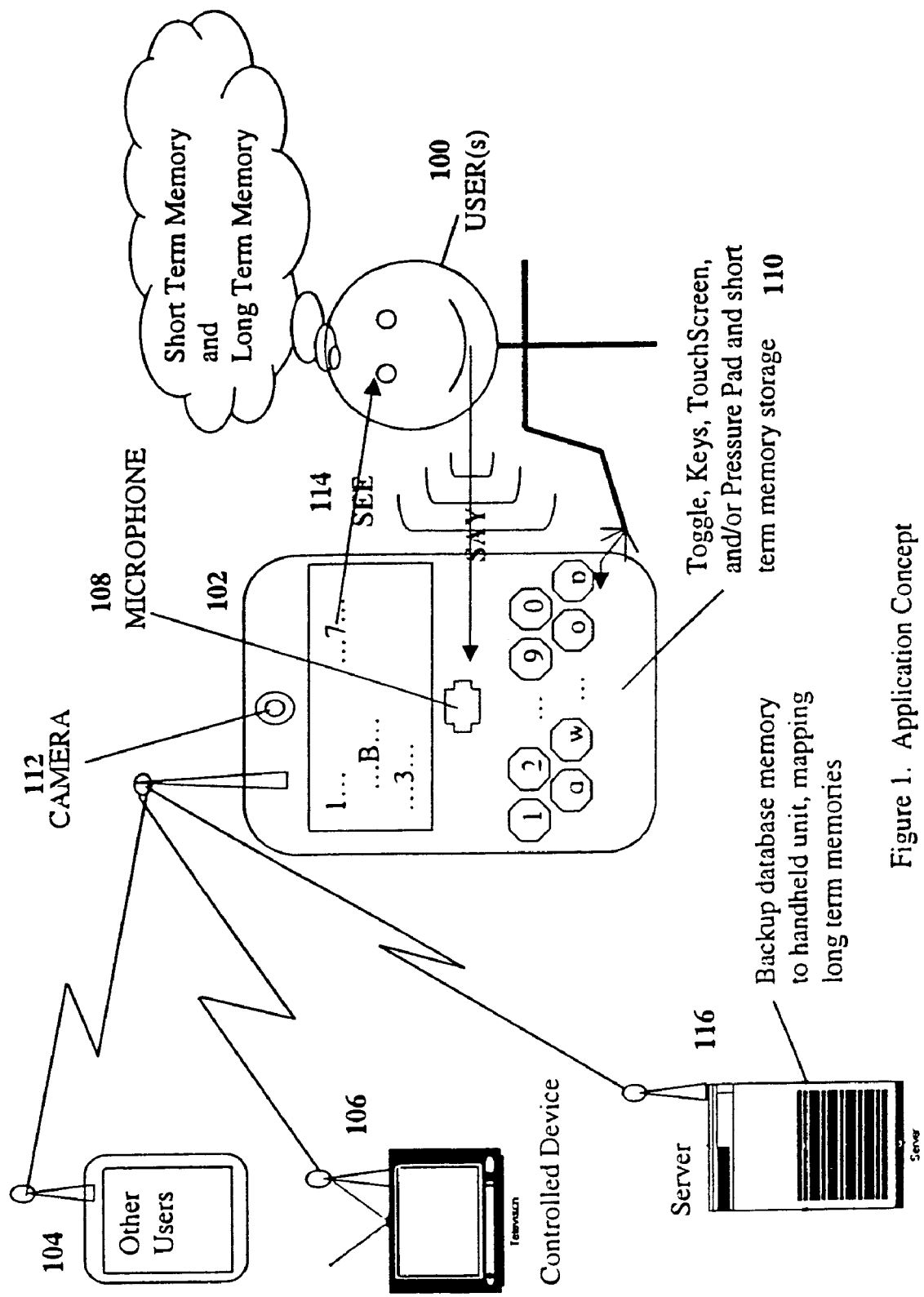
Figure 1. Application Concept

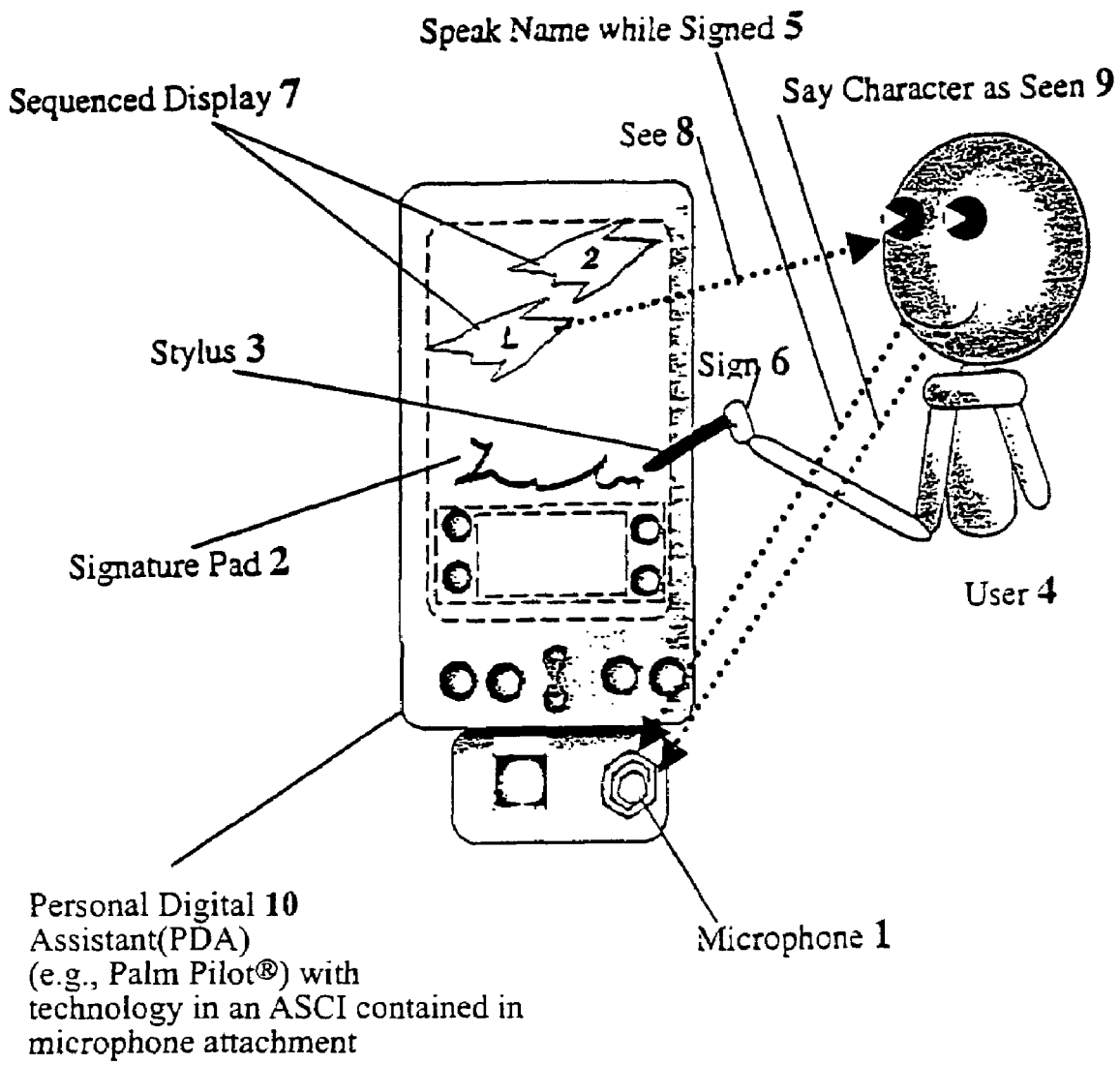
Figure 2 e-presence Application

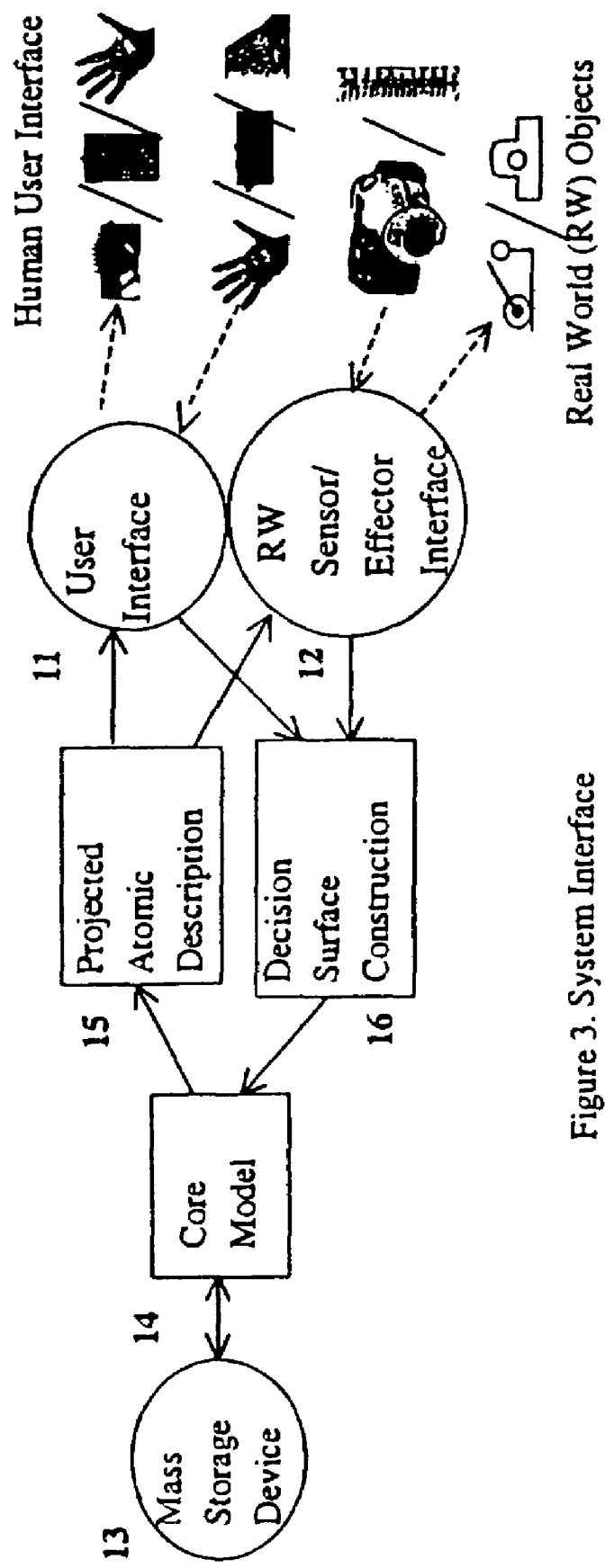
Figure 3. System Interface

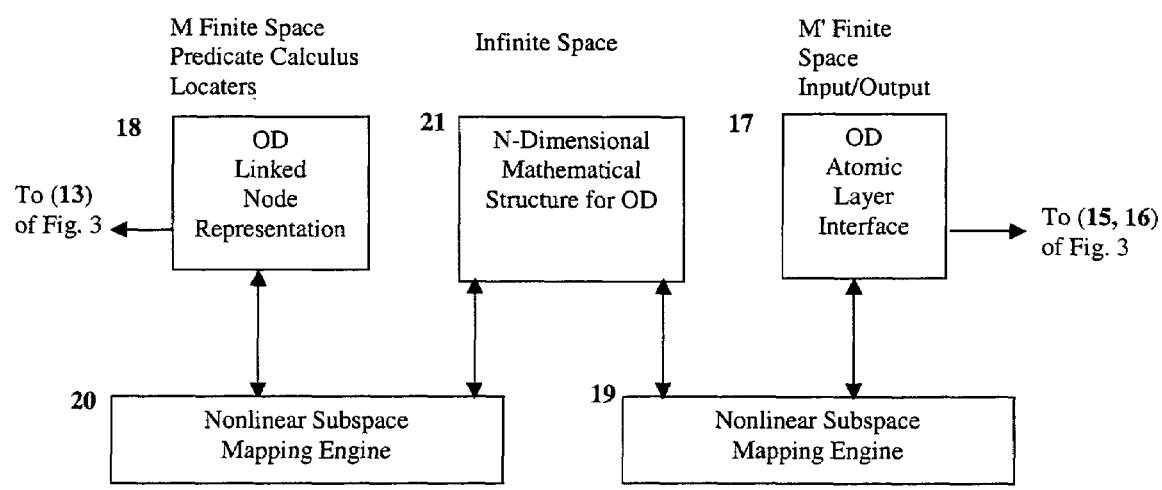
Figure 4. Core Model elements

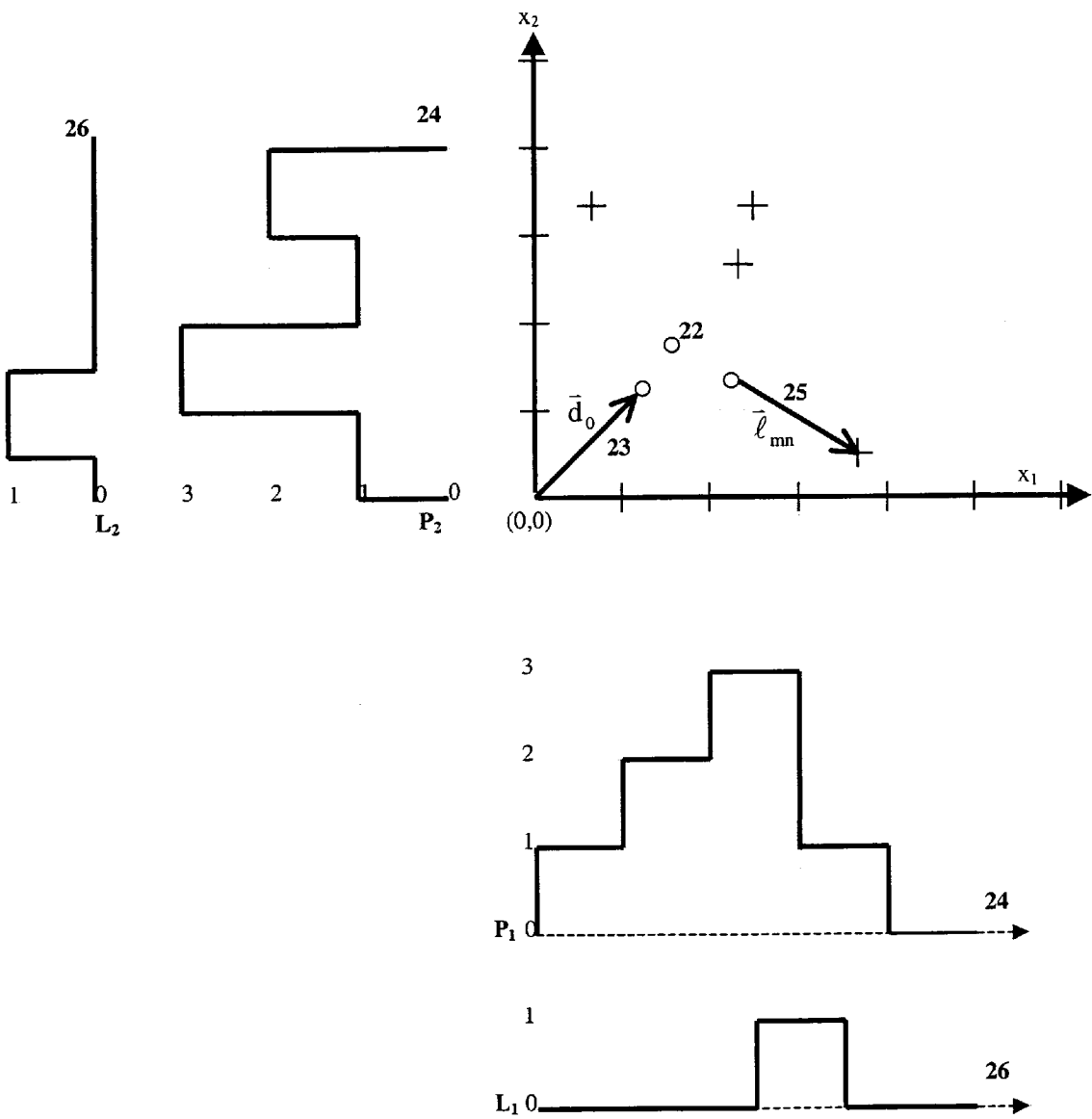
Figure 5. 2-D OD Representation a) Full Space  N = N' = 5
   (SD = 1)
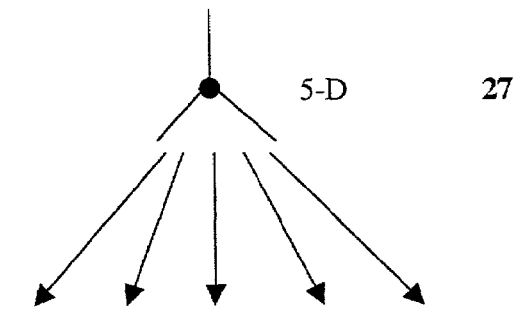
b) (N – N') = 1  N' = 4
   (SD = 5)
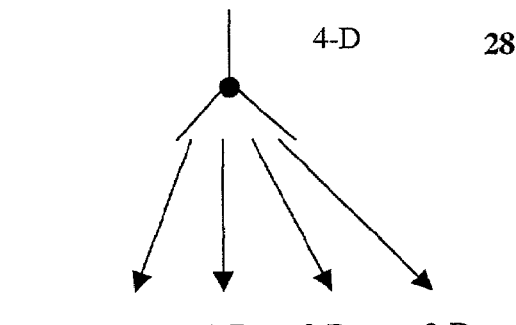
c) (N - N') = 2  N' = 3
   (SD = 5 X 4)
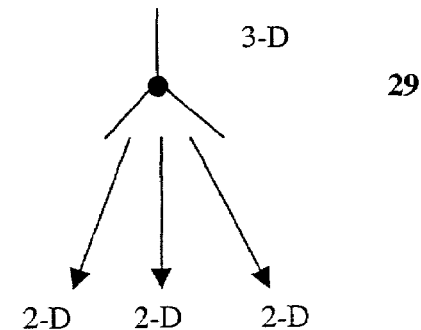
d) (N - N') = 3  N' = 2
   (SD = 5 X 4 X 3)
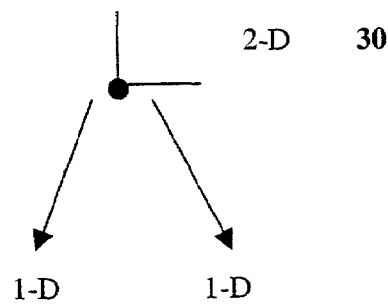
e) (N – N') = 4  N' = 1
   (SD = 5 X 4 X 3 X 2)
Figure 6. Subspace Expansion for N = 5

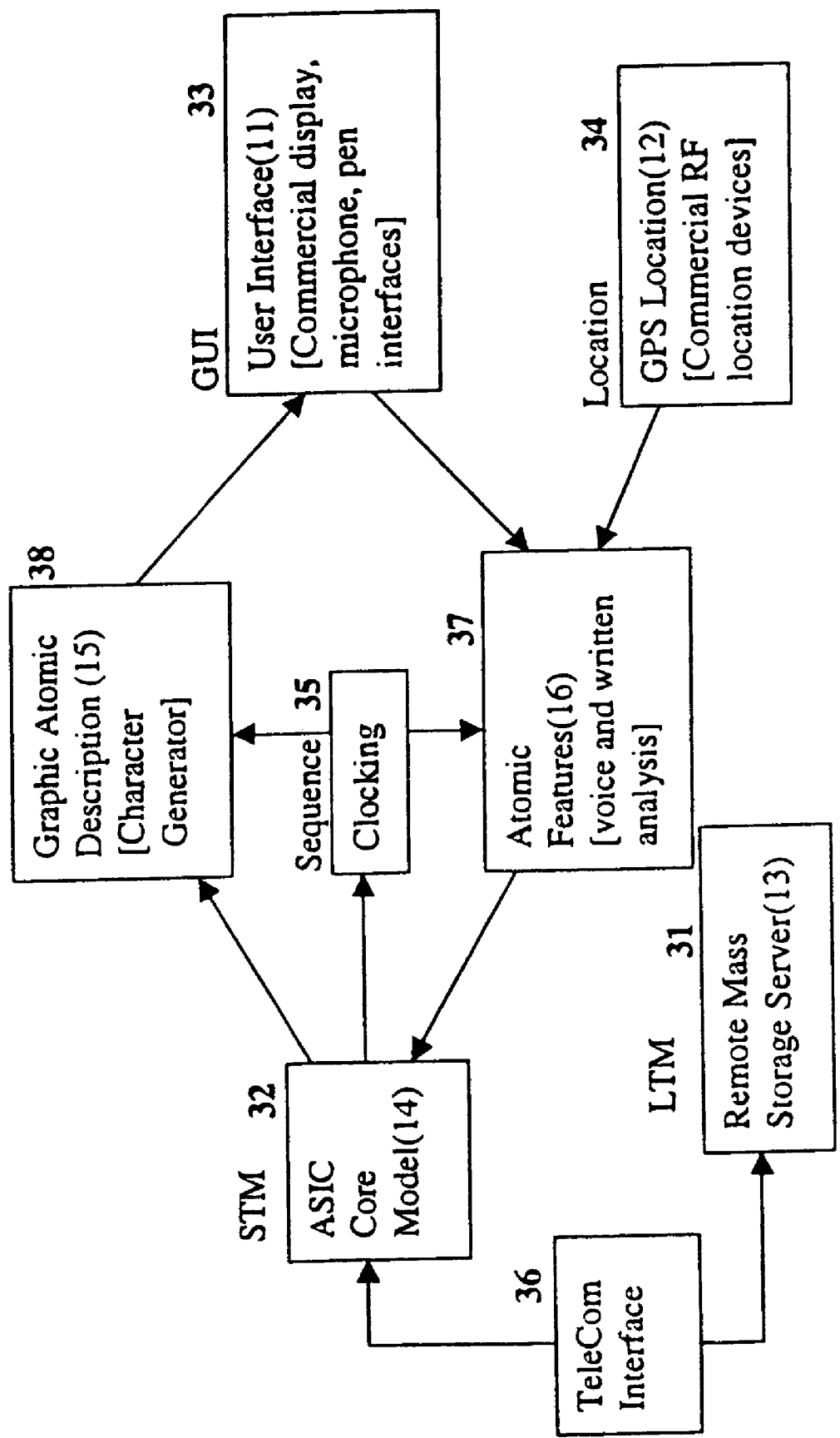
Figure 7. User Authentication ID Application

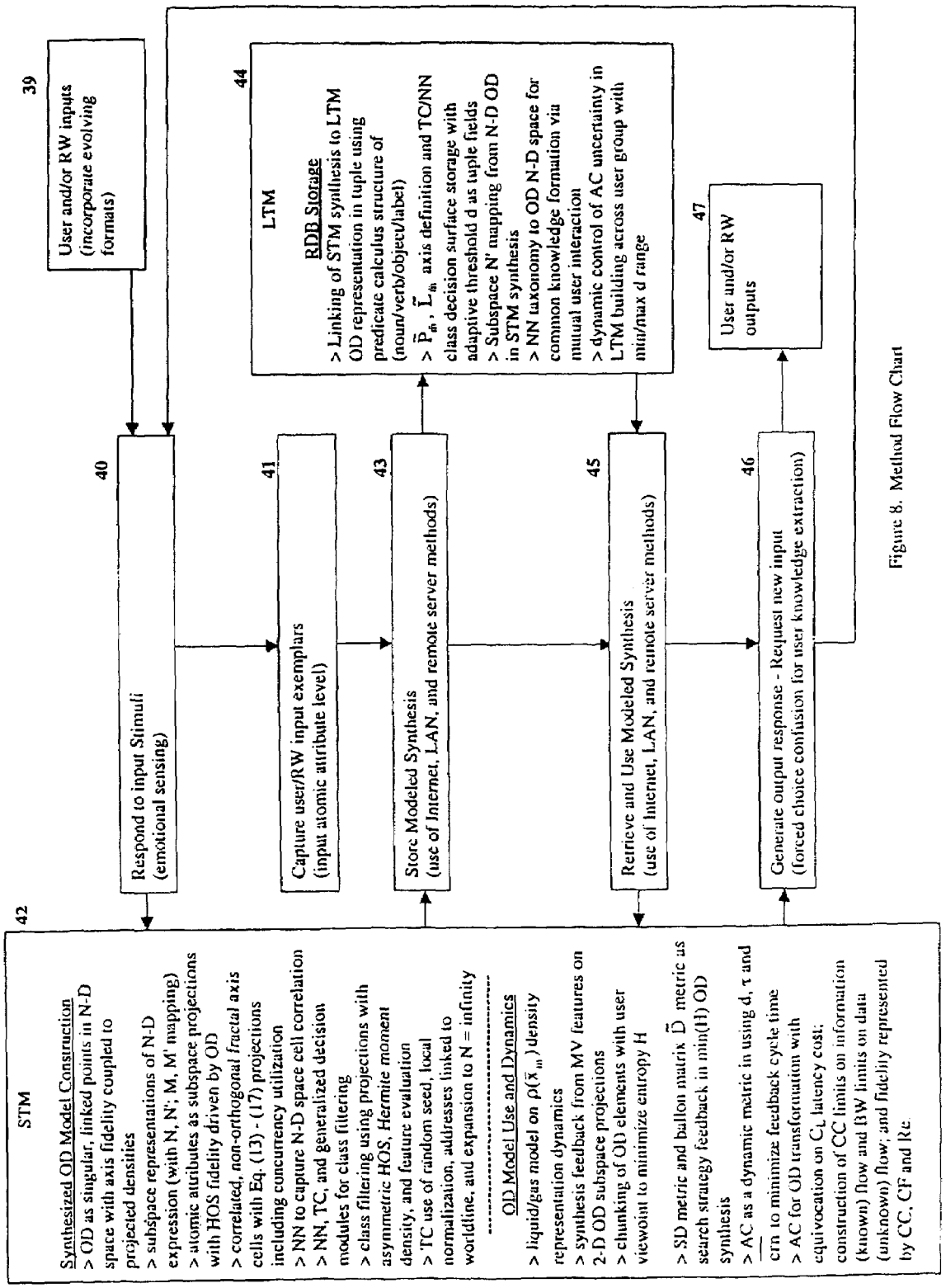
Figure 8. Method Flow Chart

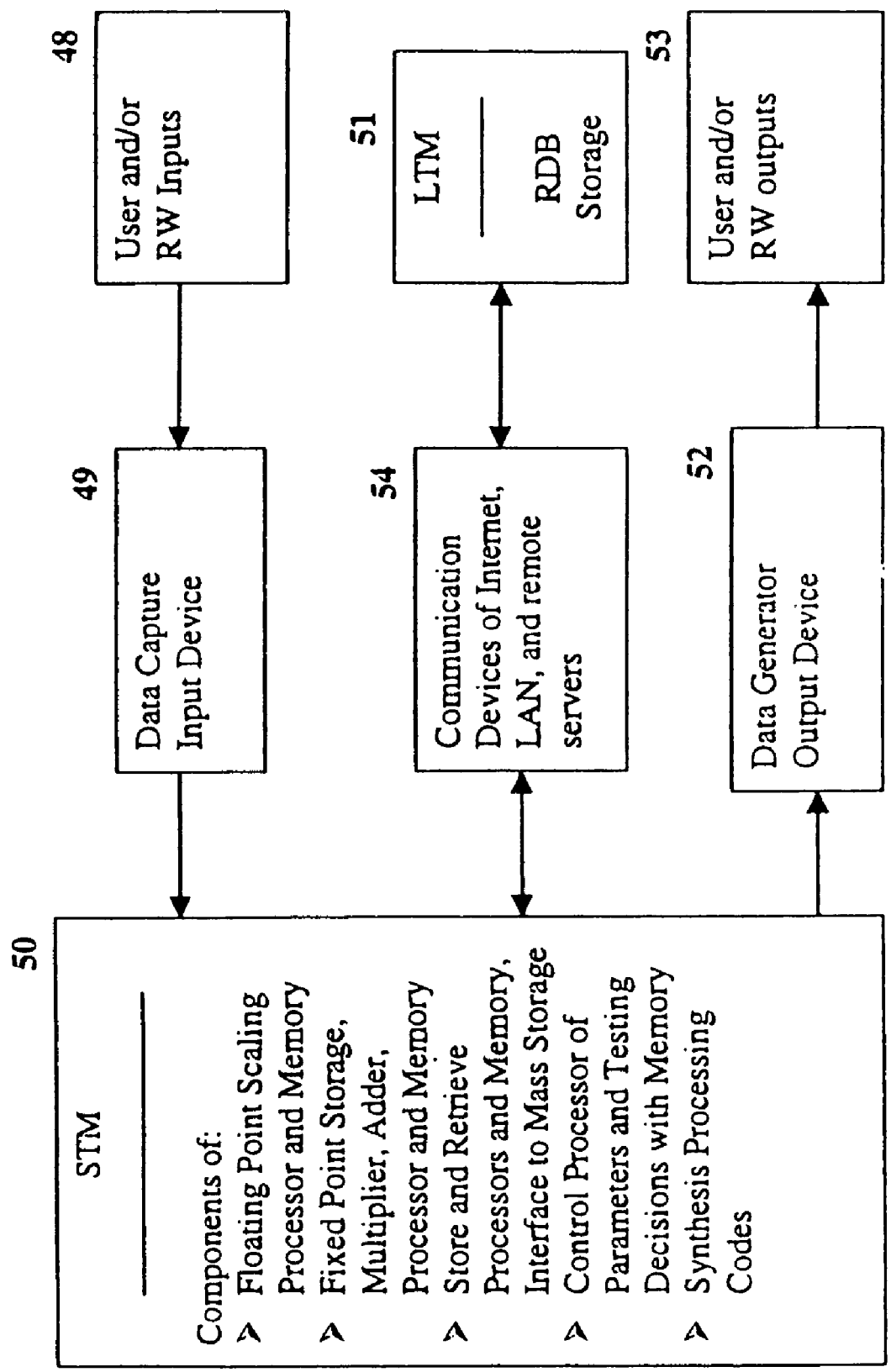
Figure 9. System Generic Block Diagram

SYSTEM AND METHOD FOR DYNAMIC KNOWLEDGE CONSTRUCTION

RELATED APPLICATION

This application claims priority from provisional Application No. 60/215,762 filed on Jun. 30, 2000, the contents of which are incorporated herein.

This application is related by subject matter to application Ser. No. 09/658,276, entitled "User Presence System and Method", filed September 8, 2000, the contents of which are incorporated herein.

TECHNICAL FIELD

The present invention relates to a system and method for dynamic knowledge construction.

BACKGROUND OF THE INVENTION

The development of Artificial Intelligence (AI) modeled human understanding of the real world (RW), as summarized by Dreyfus et al., "Why Computers May Never Think Like People," Harvard Technology Review, 42 (January 1986), is a collection of facts, rules of operation, and experiences. This collection of symbolic information varies with human skill in a particular application domain, by varying across a skill level scale from novice, through advanced beginner, and on to competent, proficient, and expert abilities. The variation of skill proceeds from the collection of facts to goal based action, with intuition and analysis resulting into the instant understanding of the expert. There is a response time associated with skill. Feigenbaum et al., "Signal-To-Symbol Transformation: HASP/SIAP Case Study," AI Magazine, 23 (Spring 1982) referred to the collection of RW data as a signal detection process. The construction of this data into symbols creates a modeled symbol-structure, composed of low-level attribute elements being clustered and grouped by RW objects (RWO) into an application hierarchy.

This process of construction was called an inference between knowledge sources and observations using an IF-THEN hypothesis-testing algorithm. Inferencing could use pattern invoked, heuristic methods or logical, tree-searched, rule-based methods. Here, the connection between RWO and the modeled understanding is through an atomic object layer (with at least one attribute or feature) and a detection process on the existence of that attribute, with a probability of detection ($P_D$) and a probability of false-alarm detection ($P_{FA}$). These atomic elements are built into more complex structures of an object diagram (OD). Solinsky, "An Artificial Intelligence Perspective on the Sonar Problem—Recognition Control Strategy in a Relational Data Base," #T85-1199/301, Rockwell International, Anaheim, Calif. (October 1985) showed that a relational database (RDB) was a means of constructing this knowledge base (KB) as that of clustering detected feature values of modeled RWOs. Here the example RWO is a tuple, and the fields of the RDB are the populated feature values.

An important element of RDB access in this application is shown by Li, *A PROLOG Database System*, Research Studies Press Ltd., John Wiley, NY, N.Y. (1984) to incorporate predicate calculus. Feature detection is the process of signal detection and feature extraction through algorithmic processing of atomic level sensor measurements using "a priori" knowledge, including a detection threshold setting value (d). Just as in the human skill model, an observation time (T) is required before a detection event can occur, and hence the symbolic construction process is discretized in time. Solinsky, "A Man/Machine Performance Model for Analyzing Sonar System Design", #T86, Rockwell International, Anaheim, Calif. (December 1986) showed that the information rate of this symbolic construction process is constant, but varies in resolution analysis between sorting Yes/No decisions at low resolution, and analysis at high resolution, and involves feedback over a fixed construction/extraction time using short term and long term memory models (STM, LTM). After symbolic construction, a sequence of atomic events can be used to retain temporal or spatial event clustering (as in object spatial movement or eye-scanning motion).

The false alarm rate (FAR) in feature-detection is the ratio of $P_{FA}$ to T. The process of matching a set of detected object features to a new set of features is that of classification, and Solinsky, "The Use of Expert Systems in Machine Vision Recognition," VISION'86 Conference, Detroit, Mich., 4-139 (June 1986) showed that the Expert System (ES) paradigm was applicable to this process in vision applications. The feedback of the setting of the threshold detection value "d" is provided by the speed of the clustering processes required. This method of threshold controlled decision process performance is based on one of five methods described later by Klir, *Advances in Computers*, Vol. 36 edited by M. C. Yovits, Academic Press, NY, N.Y., 255, (1993).

The use of object detection in visual tasks is a human expert skill implemented as a Gestalt process. Solinsky has generalized the approach for a) feature selection (see Solinsky, "A Generalized Feature Extraction Approach," VISION '87 Conference, Detroit, Mich., 8-57, June 1987), b) classification using neural-networks (see Solinsky, "Machine Vision Tutored Learning Using Artificial Neural Systems Classification," VISION '88 Conference, Detroit, Mich., 1-MS88-490, June 1988), and c) decision processes for low FAR regimes (see Solinsky, "Evaluating System Performance in Low False Alarm Rate Regimes," #JCS/ASD/92-001, Advanced System Division, SAIC, La Jolla, Calif., February 1992). Solinsky, "A Method for Compact Information Characterization in a Finite, Discrete Data Set," #JCS/ASD/93-003, Advanced Systems Division, SAIC, La Jolla, Calif. (Apr. 1993) has also presented generalized information structuring for characterizing a discrete data set in a large dimensional feature space. This technique uses an important analysis method termed a "balloon matrix" for measuring correlation in N-dimensional hyperspaces. The hyperspace "diameter" of the balloon is found in a search time, which is related to the correlation lag and the correlation order. The compact form of a subspace representation uses a fractal dimensional ordering. In this way a much larger, and even infinite space can be made into a compact, set of finite spaces. Solinsky, et al, "Higher-order Statistical Application in Acoustics with Reference to Nonlinearities in Chaos," Third International Symposium on Signal Processing Applications (HOSSPA 92), Gold Coast, Queensland, Australia (August 1992) has shown higher order statistical (HOS) correlation to exist in acoustic data from mammals and in neural data from bat brain neurons. Solinsky, et. al, "Signal Analysis of Nonlinear Dynamics and Higher-Order Statistics," SPIE Proceed. 2037 Chaos/Dynamics, San Diego, Calif. 163 (July 1993) has shown this HOS correlation to be present in other data set applications including financial data. This HOS correlation represents the Gestalt process of the N-dimensional hyperspace correlation (for N>2).

The structure for knowledge representation in AI has been dominated by the object model, with linked object diagrams (OD), such as shown by Booch, *Object-Oriented Analysis and Design*, Benjamin/Cummings Pub. Co., Redwood City, Calif. (1994) with class attribute relationships, Coad and Yourdon, *Object-Oriented Design*, Prentice Hall Inc., Englewood Cliffs, N.J. (1991) for super/sub object and associated object relationships, and the current modeling using the Universal Modeling Language (UML) by Fowler and Scott, *UML Distilled*, CRC Press, Addison Wesley Langman, Inc., Menlo Park, Calif. (2000), Rumbaugh, Jacobson and Booch, *The UML Reference Manual*, Addison-Wesley Langman, Inc., Menlo Park, Calif. (1999), and Booch, Rumbaugh, and Jacobson, *The UML User Guide*, Addison Wesley Langman, Inc., Menlo Park, Calif. (1999).

The construction of information systems that are intelligent, by being self-erecting, and capable of implementation in a computing machine, was explored by Solinsky, "Intelligent Information Systems," SAIC White Paper, (February 1995). Here the use of human interaction is used to construct information from data, as defined as "assessment by methods unrelated to the data itself." Intelligent systems have the ability to acquire and use information. These systems evolve information from data cases using an information "channel" of flow similar to the previously modeled information rate shown earlier by Solinsky (December 1986) to be limited. The process in the intelligent information system using computing machinery involves a set of metrics:

1) The information has a finite lifetime (r) and channel length L, which because of a fixed flow rate, c, limits the ability of the system to achieve instantaneous synchronization. Rather, a unit of synchronicity is finite, and is in terms of a "chron" ($crn \equiv c\tau/L$).
2) The distribution of information through replication must have a user's transaction cost ($C_R$) to limit resource wasting and time consuming processes.
3) The system must incorporate a feedback process to minimize the average cm unit in the processes ($\overline{crn} \equiv \{crn\}_{min}$).
4) The system customizes the user interaction to minimize the user's emotional level as determined through an interface (e.g., Gelernter, "The Muse in the Machine," Free Press Division of MacMillian, Inc., NY, N.Y. (1994)).
5) Diverse user interaction creates information latency, which incurs a cost ($C_L$) that randomizes information through equivocation (Solinsky (December 1986)).
6) Diverse user interaction also creates information uncertainty as an injection of information randomness or noise (Solinsky (December 1986)).
7) User feedback is used to retain information accuracy by consistent and frequent decision confirmation.
8) Both object-modeled information flow (e.g., OD) and data flow must exist in the system, where the information rate channel capacity (CC) limits the information flow rate, and the computing hardware channel bandwidth (BW) limits the data rate. This process involves a user decision of transforming unknown data into objects for investigation and analysis (e.g., unfamiliar objects are data flow). Known objects are discarded by the user (e.g., familiar objects are information flow).
9) The user actions are modeled by two levels of memory, STM and LTMs with the LTM model of familiar objects being accessed through a set of multileveled CC limited pathways. This provides an implementation of situation awareness for a specific user interaction.
10) The system incorporates an overall cost function (CF) which limits the use of information flow by a redundancy factor (Re for Re=1.0 as no information flow, and Re=0.0 as an infinite flow for a state of confusion). This CF is a nonlinear, direct mapping of Re, and is inversely mapped to the information rate CC. The CF is user and application dependent. The process of transforming data-to-objects is modeled as human perception and transforming objects-to-data is modeled as human instantiation.

A series of research proposals (Murphy and Solinsky, "Automated Model Correlator and Metamodel Building Environments," Accord Solutions SBIR Proposal A95-065 (January 1995), "The Information Computer—An Intelligent Systems Component for Consistent Abstraction of Collaborator Experience," Accord Solutions (1996), and Accord Solutions ATP proposal "Components for a Concurrent Paradigm," (May 1997)) addressed the application of this information construction structure into a series of decision surfaces based on information content in the analyzed data. A series of briefings on the information system elements (Solinsky and Murphy, "The Information Computer", Accord Solutions briefing presented from August 1995-February 1996 to McDonnell Douglas Corp. and Cubic Corp.) identified an important concept in intelligent information construction systems, which can be implemented in computing machines. This information computer (IC) consists of:

1) A LTM representation of information as a linked set of objects in an OD, with ordering based on the user's viewpoint, with objects of importance being closest, and objects of less importance being furthest away in "distance" (as a link count) from the most important object to the user.
2) The OD viewpoint allows objects of self-containment to be chunked into a single, macro object, which has links to other objects, but is fully represented in the user's viewpoint context as a single macro object. In this way the entropy H, which is a function of the OD object count (O), link count (L), and average hyperspace spanning vector (D) is defined as $H \equiv \mathcal{F}(O, L, D)$ and is minimized by chunking. In many instances, the chunked objects can capture a subspace of the general OD attribute set.
3) The user decision/response is modeled as one of three outcomes of unfamiliar objects: a) discarded as not of interest, b) modified using STM to be corrected, and c) identified as being new, and entered into LTM. Familiar objects are automatically responded to with minimal time and effort as an automatic response. The use of a forced-choice interaction model with the user is a cognitive science method of creating confusion in the representation to force the user into a reactive and possibly emotional response which accesses the user's actual LTM information.
4) The IC uses an Action Channel (AC) to construct confusion in the representation of the OD confronting the user. The AC is similar to a Shannon communication channel for data flow, except the AC constricts the information flow as discussed earlier through equivocation and uncertainty. A specific element of the AC is an access to the OD stored in LTM, with the combination of new objects randomly included as input to the channel. The channel itself involves a type specified linking process (i.e., a verb) involving a propagation time step, which changes the output OD, by adding uncertainty through additional random links added and removed from the OD as a noise process, and equivocation as an object removal process to be on the order of the input object count in order to retain the same entropy of input-to-output OD space.
5) The AC model for OD modification is based on binary construction to a single object by a link type change as noun/verb/object/labeling for labels of: a) no change (NOP), b) create a new forward link (p addition), c) combine two objects (y combining), and d) create a backward link (b addition). The noun element in the change is the identity of the original object of the OD where the linking process occurs.

The proposals by Solinsky and Murphy extended the decision process to classification techniques using a neural network decision process and a generalized decision process as represented by Klir, *Advances in Computers*, Vol. 36 edited by M. C. Yovits, Academic Press, NY, N.Y., 255, (1993). The general decision process is an expansion of $P_D/P_{FA}$ decision in a typical likelihood, cost function format, and includes a) classical set theory (Hartley, "Transmission of Information", The Bell Systems Technical Journal 1, 535-563 (1928)); b) fuzzy set theory (Zadeh, "Fuzzy Sets", Information and Control 8 (3) 338-353 (1965)); c) probability theory (Shannon, "The Mathematical Theory of Communication," The Bell Systems Technical Journal, 27, 379-423, 623-656 (1948)); d) possibility theory (Zadeh, "Fuzzy Sets as a Basis for a Theory of Possibility," Fuzzy Sets and Systems 1 (1), 3-28 (1978)); and e) evidence theory (Shafer, *A Mathematical Theory of Evidence*, Princeton University Press, Princeton, N.J. (1976) and Demster, "Upper and Lower Probability Inferences Based on a Sample from a Finite Univariate Population," a) Biometrika 54, 515-528; b) Annals of Mathematical Statistics 38, 325-339 (1967) as bounded probability, and belief functions (Shafer, "Belief Functions and Possibility Measures" in *Analysis of Fuzzy Information Vol* 1 edited by J. C. Bezedek, CRC Press, Boca Raton, Fla., 51-84 (1985))). Klir summarizes this decision process as being either involving fuzziness or ambiguity, where "strife-ambiguity" is a disagreement of alternatives and "nonspecified-ambiguity" is a set of unspecified alternatives, i.e. issues involved with decisions which require resolution because of disagreement or lack of information, e.g. at an emotional level.

The decision process of the IC was modeled to include Klir's min/max uncertainty ranges of decisions to become invariant to uncertainty through the user decision process, such that the evolved LTM OD is the same information from all user viewpoints which then becomes a common set of information or knowledge.

This background work in AI and information modeling has not included the combinations described for the IC and the use of neural-networks (NN) in decision processes of OD representations. Eliot, "Ruling Neural Networks," AI Expert, 8 (February 1995) has shown that a NN is not as easy to understand as an AI ES, which involves only rules. This is because ES logic involves discrete binary Yes/No states and NNs involve sigmoid-shaped decision surfaces with a focus on the "Maybe" region in the Yes-to-No transition region of the sigmoid. While ES's attempted to include this as a user input/review process with a certainty factor in decisions, this approach was unsuccessful because its final output was not a complete decision. The lure of the ES rule-based modeling is its compactness, but this can better be represented in a predicate calculus format with NN decisions as incorporated into this invention. The current invention transforms the OD models and AI of the IC to a mathematical hyperspace representation which is efficiently represented and operated on for RW applications using efficient bit-level manipulation and computation.

A series of patents have dealt with ODs and the use of object models in applications, and particularly with RDB accessing. U.S. Pat. No. 3,970,992 deals with a keyboard macro for retrieval application in a data processing system. U.S. Pat. No. 4,906,940 deals with a "rubberized" template matching approach for guiding an object on a road. U.S. Pat. No. 5,506,580 involves a data compression approach using a character stream library encoding. U.S. Pat. No. 5,548,755 is a hashing technique to optimize RDB-grouped query access. U.S. Pat. No. 5,586,218 uses case-based reasoning for information gathering in a RW sensor derived data set. Here, decision and case construction use a Genetic Algorithm decision process. U.S. Pat. No. 5,701,400 constructs a tool-kit for financial advisors based on weighted logic ES, IF-THEN-ELSE rules to data sets in a RDB.

U.S. Pat. No. 5,712,960 incorporates abductive reasoning as a meta interpreter for updating a communication data base management system. U.S. Pat. No. 5,768,586 uses an object structure for data configuration in system modeling of complex enterprises, which begins with high level user descriptions and constructs low level descriptions from the modeled process. U.S. Pat. No. 5,778,378 is a document retrieval application of an object-oriented (OO) framework for word indexing and parsing. U.S. Pat. Nos. 5,790,116; 5,794,001, and 5,900,870 use a GUI to construct a hierarchical definition of an object structure in a data record application. Templates are used for selecting data fields linkable to a collection folder of instantiations. Various 2-D graphics, are used, such as a node-arc graph. U.S. Pat. No. 5,806,075 uses a triggering methodology based on data values, of data duplications between local and remote sites. U.S. Pat. No. 5,832,205 is a memory failure detection process based on comparative instruction analysis. U.S. Pat. No. 5,875,108 is a GUI interface intelligence through adaptive pattern recognition of historic actions as in a button pushing effort using a VCR remote control. U.S. Pat. No. 5,893,106 incorporates a server support to client users, which encapsulates a class hierarchy of 3-D graphics in data base applications. U.S. Pat. No. 5,905,855 corrects errors in computer systems by two state analysis of initial and final state reference points.

U.S. Pat. No. 5,911,581 incorporates a metric for determining mental ability of complex task solving, and models reaction time, awareness thresholds, attention levels, information capacity and LTM access speed. U.S. Pat. No. 5,915,252 uses a consistency check between a data source and target to simplify a user's job in data transferring. It includes protocol free construction of ES object links embodied in a common user interface. U.S. Pat. No. 5,926,832 is a means of increasing memory access by memory address analysis and storage. U.S. Pat. No. 5,936,860 is an application to warehouse control functions by a user with OO data modeling. U.S. Pat. No. 5,953,707 uses a planned decision model in a client/server database from various user viewpoints in sales planning and inventory management as a user GUI without an OO model. U.S. Pat. No. 5,958,061 uses a cache to store states for instruction translation. U.S. Pat. No. 5,966,712 applies to the use of RDB storage of biomolecular sequences which, compares sequence frames and groups of frames and displays results to the user.

U.S. Pat. No. 5,970,482 applies to the application of feed-forward decisions to the data mining process. A predictive model is used to compare and rank symbolic data correlation significance. U.S. Pat. No. 5,978,790 uses an edge-labeled tree approach to match input elements to output restructuring in a semi-structured database. The tree can only be structured in 2-D data base structures. U.S. Pat. No. 5,991,776 involves an application of RDB indexing by linking tuple identifications to the document, but does not use an OO structure.

U.S. Pat. No. 5,995,958 manages a database through the use of acyclic graphs by mapping an infinite data set to a finite storage of a X-function core representation. It is applied to RDBs with user query support, but does not involve OO models, since the links are independent of the node contents. U.S. Pat. No. 5,999,940 incorporates a 2-D visual representation for user discovery and visualization for applications involving multiple access to databases, such as in health and doctor treatment areas. U.S. Pat. No. 6,002,865 uses a multi-dimensional set of spreadsheet pages to construct a database by multiple levels of resolution. U.S. Pat. No. 6,003,024 deals with row selection of 2-D database accesses for attribute-based record selection as an intersection of attribute correlation in 2-D. U.S. Pat. No. 6,006,230 involves a client/server remote user access application modeled in OO technology for proxy mapping.

U.S. Pat. No. 6,009,199 is a decision process for classification in decision trees. It is an iterative mapping of subspace to full space based on discriminative processes. The perceptron model is used in classification.

The previously cited U.S. Pat. Nos. 5,832,205; 5,905,855; 5,926,832; and 5,958,061 and U.S. Pat. No. 6,011,908 deal with the iterative translation of computer microprocessor instructions to a target set of processor states embodied in a chip set with gated memory buffering. The process speeds up the instruction execution as historic references occur, and the system consequently becomes more adept at predicting the next sequential executable instructions. This is an N=2 form of correlation prediction.

SUMMARY OF THE INVENTION

The system and method described in the detailed description below are usable to, among other things, generate outputs in response to real world stimulation. These outputs are generated by capturing concurrent inputs that are responsive to training stimulation, storing a model representing a synthesis of the captured inputs (that may be based on a mathematical projection of a hyperspace-modeled OD), and using the stored model to generate outputs in response to real-world stimulation. The system and method may be used in a wide variety of human interaction applications and apply to conventional storage and presentation devices, permitting the system and method to be easily incorporated into a variety of commercial products that utilize human-machine interfaces (e.g., HMI graphical user interface, or GUI) and current mass storage devices. By way of example, not limitation, the system and method may be applied to user presence and/or identification. In this case, the concurrent inputs may be handwriting and speech. In one particular example, the speech may be related to the handwriting such as when a person speaks his or her name while at the same time writing his or her name. A model representing a synthesis of these concurrent handwriting and speech inputs is stored. The model may, for example, be a worldline of linked object diagram exemplars in an N-dimensional space. The real world stimulation may be concurrent handwriting and speech inputs that are compared to the stored model, and the outputs (e.g., an identity verification) may be based on the results of the comparison. The use of a mass storage device, such as but not limited to an RDB, linked to the OD model by projections and NN/TC decisions in a binary taxonomy mapping, provides for a continuous expansion of each application complexity. The methodology of the present invention may be at least partly incorporated into a computer software program, a hardware processing engine, a specialized hardware application specific integrated circuit (ASIC) chip, or net list representations for a variety of ASIC technologies.

The system and method may further include a forced choice interaction that generates one or more additional inputs that are captured and incorporated into the model. In the case of user identification, the forced choice interaction increases the probability of correct user identification, and can include measurements of user emotions and/or stress. For user identification, the forced choice interaction generates speech inputs that are responsive to a display of one or more images that may each include one or more letters, characters, numbers, symbols, images, etc. and combinations thereof.

The present invention is described in the context of illustrative embodiments. A key concept of the invention is that the user's short-term and long-term memory is captured into an algorithmic framework by interaction with the user during "training" which then understands the decisive needs and wishes of each individual, and is able to dynamically map this information to low-level control functions used by commercial devices or to express this information to other users by using a common, intermediate method of information storage. This mapping uses a linked-object model in an infinitely expandable hyperspace (implemented as a bit-level computation), with synthesis creation based in user forced-choice input, and projected density derived, HOS feature comparison. By using a short and long-term storage approach, the utility of the concept is extendable to many applications with increasing complexity, with expandability only limited by the physical storage devices and communication hardware bandwidths.

The complexity and expandability of user interaction can vary for each application, as does the variation and extent of the resources supporting this interaction. The simplest embodiment might be an apparent intelligent interaction response to the user with home appliances, which is through a single interface, far more advanced than a collection of remote control units (e.g. VCR remote controls, garage door opener, remote telephone extension, etc.). A numeric scale to represent this complexity (dubbed the Accord Scale, from 1 to 10 in logarithmic value; note that there is no value of "0" which would represent the complexity of N=1, or a VCR control) is illustrated in Table 1. The OD entropy is a key element in the formulation of the Accord Scale complexity.

TABLE 1

Accord Scale

| Numeric Value | O.D. Space Dimension (N) | Complexity | Application |
| --- | --- | --- | --- |
| 1 | 10 | Low | Commercial electronic signature verification for single user. |
| 2 | 50 | Moderate | Internet music source search engine for single user finding of an MP3 music selection of current tastes, independent of type, artist, musical instrument choice, etc. |
| 5 | 100,000 | Medium | Economic prediction models based on a number of users, cooperatively interacting with historic and globally dynamic databases, as developed from long-term memory. |
| 7 | 500,000,000 | Very High | Representation of the human genome code for a variety of health conditions compounded across multiple symptoms from many medical history examples with a utility in singular drug therapy. |

The specific examples are meant to show the growth in complexity of the user count, the historic and developed database encapsulation developed for each application, and the complexity of each output requirement. Note that the scale of N is not necessarily an OD volumetric growth, since the invention uses a more linear linking of the hyperspace.

These examples are for illustrative purposes and a detailed discussion of electronic-signature verification is provided in the detailed description below.

None of this prior art involves access in information structures for dimensions N>3 or incorporates adaptive decision processes using neural-networks (NN) as a form of N-dimensional cell correlation representation. None of these approaches in information construction, organization, or prediction, incorporate higher-order correlation or HOS, and avoids the common AI ES, IF-THEN-ELSE, and logic-tree constructions. All template matching and correlation of this prior art are restricted to 2-D, linear techniques. None of this prior art incorporates an AC for user information testing with emotional sensing to construct common-information knowledge in a LTM, and also create confusion in a STM forced-choice decision process. None of this prior art incorporates the metrics of the IC in information flow parameters of rate c, channel capacity (CC), and information system length L and the temporal parameters of $\tau$, crn, $\overline{crn}$, T, and cost functions $C_R$, $C_L$, CF and redundancy function Re. None of this prior art uses entropy, H, as a metric function of the OD representation vector space spanning distance $\tilde{D}$, for controlling analysis resolution, nor does it use predicate calculus for link location in a RDB. None of this prior art simplifies the OD model to a set of points in an N-dimensional space, which is expandable through an extension to the LTM storage of projection operators and decision surfaces, rather than explicit examples through feature attributes. By using a partially correlated axis space, which can be fractal in nature, this representation is expandable through subspace constructions at any later point in time, without loss of original model parameters. This invention addresses the original RDB constructions and avoids the approximations used in SQL development. The invention incorporates the simultaneousness of the input features in an N-D spatial correlation for a unique utility and storage of human and sensor information.

The invention can be applied to human interaction applications that are not represented in N=2 dimensional methods such as drawings, graphics, spreadsheets or database queries. These human interaction applications involve a complexity of dimensional correlation for very large N, which is beyond second order correlation and linear processes of N=2 applications and instead the correlation is of a concurrent, nonlinear order N, as in Gestalt thinking. This concurrency is described through HOS representations and synthesis of the model. The system is a unique capability for information storage and retrieval which is beyond conventional graphic description for review, and is fundamentally user and hierarchically independent.

These and many other advantages of the present invention will be more completely understood and appreciated by careful study of the following more detailed description of illustrative embodiments of the invention taken in conjunction with the accompanying drawings.

BRIEF DESCRIPTION OF THE DRAWINGS

FIG. 1 shows the invention application concept of user interaction through a simple device with other users, control functions, and an extension of the hand-held device to increasing resources embodied as a computer server device.

FIG. 2 shows the electronic-signature verification application example on the Accord Scale of complexity value 1, and involves a complexity in multi-channel user inputs for simultaneous correlation in electronic identification.

FIG. 3 details the invention system interfaces for a general application, with real world object sensing and control, and human user interfaces, with the fundamental mapping to a Core Model and a Mass Storage Device.

FIG. 4 details the Core Model elements of finite resource dimensions from input M' dimension and storage device M dimension, from the infinitely expandable N space of the application complexity.

FIG. 5 details a simple 2-D example of mapping an OD space of object locations and links to projected densities into lower dimensional subspaces which are characterized by density moments, here shown for N=1.

FIG. 6 details an example of the subspace mapping expansion from N=5, down to the simple 1-D densities of FIG. 5.

FIG. 7 details the use of the invention technology derived from this invention in the electronic-signature verification application of FIG. 2.

FIG. 8 details a flow chart of the invention method.

FIG. 9 details a generic block diagram for the invention system.

GLOSSARY

For ease of reference, the following glossary provides definitions for the various abbreviations and notations used in this patent application.

| | |
|---|---|
| AI | Artificial intelligence |
| HMI | Human-Machine interface |
| GUI | Graphic user interface |
| RW | Real world |
| RWO | Real world objects |
| $P_D$ | Probability of detection |
| $P_{FA}$ | Probability of false alarm |
| RDB | Relational database |
| SQL | Structured query language |
| KB | Knowledge base |
| d | Detection threshold setting value |
| T | Observation time |
| STM | Short-term memory |
| LTM | Long-term memory |
| FAR | False alarm rate |
| ES | Expert system |
| HOS | Higher-order statistics |
| OD | Object diagram |
| UML | Universal Modeling Language |
| $\tau$ | Information lifetime |
| L | Information channel length |
| c | Information channel flow rate |
| crn | Temporal synchronicity unit or "chron" |
| $C_R$ | Information replication cost function |
| $\overline{crn}$ | Average crn unit minimized by feedback |
| $C_L$ | Information latency cost function |
| CC | Information rate channel capacity |
| BW | Hardware channel data rate bandwidth |
| CF | Cost function limits on information flow |
| Re | Redundancy factor |
| IC | Information computer |
| H | IC entropy of OD |
| O | IC object count in OD |
| $\tilde{D}$ | IC OD hyperspace spanning distance vector |
| L | IC OD link count in OD |
| $\mathcal{F}()$ | Function of contained elements |
| AC | IC action channel |
| NOP | No operation change in AC to OD for iteration cycle |
| p | AC labeling for forward link addition in AC to OD |
| y | AC labeling for combined link in AC to OD |
| b | AC labeling for backward link addition in AC to OD |
| NN | Neural-networks (form of decision mapping) |
| OO | Object-oriented |
| M, M' | Finite dimensional OD space for LTM mass storage (M) and RW interfaces (M') |
| N | Infinite dimensional OD space for STM decision processes |

-continued

| | |
|---|---|
| $\bar{n}$ | N-D space attribute axes |
| $n_i$ | $i^{th}$ attribute space axis |
| i | Location count index of $n_i$ axis |
| $x_1, x_2$ | 2-D example of attribute axes |
| $d_o$ | Location vector of $o^{th}$ index object exemplars in n attribute space |
| o | Object index in OD space |
| O | Total count of o |
| $\tilde{P}_i$ | Hyperspace 1-D profile projector onto the $i^{th}$ axis of OD object locations |
| $P_1, P_2$ | Histogram representation of $\tilde{P}_i$ projected profiles for axes $x_1$, $x_2$ |
| $\bar{l}_{mn}$ | Hyperspace link vector between objects m and n of OD |
| $\tilde{L}_i$ | Hyperspace 1-D profile projector onto the $i^{th}$ axis of OD link locations |
| $L_1, L_2$ | Histogram representation of projected profiles $\tilde{L}_i$ for axes $x_1, x_2$ |
| $C_{\bar{o}}$ | Class "c" distinction of subset of objects in vector $\bar{o}$ |
| l | 1-D index of link vectors $\bar{l}_{mn}$ |
| $L_l$ | Total count of index l |
| N' | Subspace finite dimension count of OD from N space dimensions of OD |
| $\bar{m}$ | Specific example set of dimensions in subspace count M (here used for N') |
| $\tilde{P}_{\bar{m}}, \tilde{L}_{\bar{m}}$ | Hyperspace M-D profile projectors for object and link densities to subspace $\bar{m}$ from OD space $\bar{n} > \bar{m}$ |
| $P_{\bar{m}}, L_{\bar{m}}$ | Histogram representation of profile projectors $\tilde{P}_{\bar{m}}, \tilde{L}_{\bar{m}}$ for axes $\bar{m}$ |
| $\tilde{P}_{\bar{m}}^c, \tilde{L}_{\bar{m}}^c$ | Hyperspace M-D profile projectors for object and link densities to class-filtered object subset "c" in subspace M from OD space $\bar{n}$ and $\bar{m}$ and c < O. |
| $P_{\bar{m}}^c, L_{\bar{m}}^c$ | Histogram representation of profile projectors $\tilde{P}_{\bar{m}}^c, \tilde{L}_{\bar{m}}^c$ for axes $\bar{m}$ |
| $A_m$ | Central moments of 1-D population density of order m |
| $A_o$ | Total count of projected profile 1-D density |
| a | Area $A_o$ for M = 1 space projection |
| $A_1$ | Centroid mean |
| $\mu$ | Mean $A_1$ for M = 1 space projection |
| $A_2$ | Centroid (area normalized) second central moment |
| $\sigma^2$ | Variance central moment of $A_2$ for M = 1 space projection |
| $A_3$ | Centroid (area normalized) third central moment |
| $m_3$ | Skewness central moment of $A_3$ for M = 1 space projection |
| $A_4$ | Centroid (area normalized) fourth central moment |
| $m_4$ | Kurtosis central moment of $A_4$ for M = 1 space projection |
| $d_c$ | Simple class distance metric used in constructing class decision surfaces of second-order statistical densities (i.e. Gaussian). |
| S | Normalized $m_3$ moment (i.e. S = 0 for Gaussian) |
| K | Normalized $m_4$ moment with excess correction to Gaussian (i.e. K = 0 for Gaussian) |
| MV | Machine vision |
| SD | Subspace diversity variable based on N and N' for each N' example |
| $\rho(\bar{x}_m)$ | Image pixel density of subspace dimension m as a function of dimensional absolute distance $\bar{x}_m$. Used in computing moments and is a higher dimensional representation of FIG. 3 histograms. |
| $A_0^m, A_1^m,$ $A_2^m, A_3^m,$ $A_4^m$ | Extension of $A_m$ for m = 0, 1, 2, 3, 4 to m-D subspace central moment density weighted computations. |
| $S^m, K^m$ | Extension of S and K to m-D subspace central moment density weighted computations |
| TC | Terminal cycle (form of decision mapping) |
| S(i) | Step operator value of random table lookup function from "pixel" value input seed at location address "i" in TC mapping |
| $\bar{S}_n$ | Location vector of addresses generated in n dimensional space based on TC sequences using step operator function values S(i) for a stable TC "orbit" |
| $\epsilon_{nm}$ | Eccentricity of major and minor axis in 2-D (n, m) representations |
| LAN | Local-area network |
| GPS | Global Positioning System |
| RF | Radio frequency |
| ASIC | Application-specific integrated circuit |
| LPC | Linear predictive coding |
| ID | Identification |
| Y | Count of TC iterations |

DETAILED DESCRIPTION OF EXAMPLE EMBODIMENTS

The invention is described with reference to a typical example application as an intelligent interface between two classes of elements used in many product-based application devices as shown in the invention application concept of FIG. 1. FIG. 1 shows a human user 100 interacting via a hand-held unit 102 with other users 104, as in a communication system, and with other devices 106, as in a television control system. This interaction is two-way: as in speaking into a microphone 108 of hand-held unit 102 (e.g. "say"), or punching keys on the unit's keyboard 110, or moving in front of the unit's camera 112; and as in reading numbers displayed on the hand-held unit's display 114 (e.g. "see"). The human user 100 is able to communicate with other users 104 and the controlled devices 106 through a tailored, dynamic interface that is based on the short-term (as in current and recent thoughts) and long-term (as in past and remembered thoughts) user's dynamic memory recollections. The hand-held unit 102 has a built-in memory (not shown in FIG. 1) that stores the specific user(s) preferred interaction methods as a short-term memory, and has additional memory to extend this mapping via a connection to a network server 116 for long-term memory storage. This extended mapping (networked database) contains information from multiple users, and in itself captures commonality among the user interactions.

A specific example application of this invention concept is shown in FIG. 2 for electronic signature verification and specific user presence confirmation, dubbed e-presence. Here, the user is using a simple, commercial input device, such as a Personal Digital Assistant (PDA) 10 with a stylus pressure keypad and a microphone input. The microphone 1 is used to acquire input data from the user 4 speaking one's name (as indicated by the line associated with reference numeral 5), at the same time that one is signing one's name by hand 6 on a signature pad 2 using a stylus 3. In familiar three-dimensional space, a person or object can be located by specifying three coordinates. In an x-, y-, z-space, the x-, y-, and z-coordinates are specified. In accordance with the present invention, additional axes are added to generate an N-dimensional space. For example, one additional axis may represent time, another additional axis may represent temperature, etc. The current x position, the current y position, and the current z position, the current time, the current temperature, etc. define a particular point within this N-dimensional space. The changes over time of x position, y position, z position, time, temperature, etc. define a path or a "worldline". The correlated speak/sign signature verification constructs unique user identification of attribute space dimension N=10 (5 signature features and 5 aural/spoken features) and consists of a linked OD in the invention technology for comparison to previous user "training" signatures. This first phase of the e-presence application is not just using signature recognition, as might be in a thumb print reader, and susceptible to forgery or facsimile input, nor is it just using aural identification of the user's voice, which could be compromised by using a tape-recorded spoken name. Rather, the e-presence system is capturing a dynamic event of a speak/sign correlation of motions and actions, which is expressed in all the manners of the specific user via the N=10 dimensional space concurrency. The time sequence of this speak/sign process creates a "worldline" of linked OD exemplars in the ten-dimensional space. Of course, speak/sign are merely examples of concurrent inputs that are responsive to training stimulation and the scope of the invention is not limited in this respect. In fact, the invention could apply to an interface for a severely handicapped person, whose biometric inputs might be just a flutter of eyelids in front of an eyepiece camera. Also, the invention is not limited to two concurrent inputs and is generally applicable to two or more concurrent inputs. The number and type of concurrent inputs will generally depend on the particular application developed in accordance with the inventive concepts described herein.

It is expected that because of this high dimensionality, the first phase of the e-presence process of N=10 will have a probability of correct (Pc) user ID after only a few training sessions (e.g. less than ten), and will be Pc≧95%. However, this is not at all sufficient for electronic signature applications in commerce, and so a second phase of e-presence involves the use of a sequenced display 7 of the PDA 10. Here, a set of letters (or numbers) are sequentially shown to the user to see (as indicated by the line associated with the reference numeral 8) each letter, one at a time, which, after each display, one is asked to say (as indicated by the line associated with the reference numeral 9) the displayed letter name. The rate of display is based on a forced-choice user mode (on the order of five per second), and includes the dynamics of the sequence. While a set of letters are sequentially shown in this example, the sequenced display 7 may generally be images that may each include one or more letters, characters, numbers, symbols, images, etc. and combinations thereof.

Thus, the see/say part of the second phase includes a dynamic recognition of again an N=10 attribute representation, where here all the attributes are based on the aural spoken sounds of a known-displayed letter. The sequenced exemplars create a second user worldline. The Pc for this second phase event is expected to be Pc>90%. Because the displayed letters are random and change each time the system is used, the false detection rate here is expected to be much lower, resulting in a combined first and second phase of e-presence to be a combined Pc>98.5%.

This example application may be further embellished by including increased complexity of failed first phase testing, and user dynamic profile updating as well as stress detection and emotional sensing overrides. In summary, the e-presence application precedes through the steps of Table 2.

TABLE 2 e-presence Application Steps

| Action | N | Pc | Pc |
|---|---|---|---|
| 1 Sign/Speak | (5 aural; 5 signature) | 95% | or <95% (increase complexity) |
| 2 Repeat 1 if Pc < 95% | (10 aural; 10 signature) | 98% | or <98% (stop) |
| 3 See/Say | (10 aural) | 90% | or <90% (increase complexity) |
| 4 Repeat 3 if Pc < 90% | (20 aural) | 90% | or <90% (stop) |
| 5 Accept Identification | | | |

The invention is further detailed in this application after the following initial fundamental description of the technology.

FIG. 3 shows the key elements of the application concept shown in FIG. 1 and the example e-presence application shown in FIG. 2. FIG. 3 shows a means of interfacing a general purpose user and sensor/effector-based commercial device to a relational database (RDB) mass storage device which provides an isomorphic mapping of human knowledge interaction for dynamic intelligent responses that are independent of the application domain (or multiple domains) or user (or multiple user) specifics. The advantages of this approach over the prior art are that the simplistic user and RW interfaces can create a concurrency of stimulations in a high dimensional space for more precise modeling, which is also storable using a simplistic 2-D or 3-D mass storage method. The first class of elements shown in the figure is for user and sensor interfaces. The user-receiving interface 11 includes data outputs in the form of visual displays in graphics or text, aural as sounds or speech, and kinesthetic as vibration or thermal/electrical stimulation. The user transmitting data inputs interface 11 includes data inputs in the form of kinesthetic-controlled device elements such as mice, keyboards, gloves, or joysticks; chemical/odor elements as in human odors or skin moisture/sweating; and spoken sounds or word elements. In addition, other RW sensor inputs 12 are used in the example interfaces, which can include, but are not limited to electronic camera/video data, GPS location sensing, remote thermal sensing of human elements in scanned or image data, and possibly switch based element motion. Finally, RW control output devices 12, such as lever arms, motors, and robotics are used as effector devices.

The second class of elements shown in FIG. 3 and used in these same applications are for the mass data storage devices 13, which can be the computer server shown in FIG. 1 and can be constructed of typical read/write functionality in magnetic, magneto-optic, random access memory (RAM), flash electronic memory, and any other electronic, or optical/electro-mechanical devices capable of storing and retrieving data values in digital format (bits, bytes, words), which are inherently in a physical structure and have an access format in two dimensions (as surface cells or surface locations) or in three dimensions (as volumetric cells such as holographic optical access or collections of surface locations, such as disk platters). These interface structural dimensions can be summarized as linking a LTM, physically contained in a low-dimensioned, physically constructed mass storage device 13 (i.e. with a finite dimension≦3), to a RW access method involving human and sensor/control interactions of various attributes and also being of finite dimensions 11, 12.

The system and method constructs three properties of algorithmic function, also shown in FIG. 3, that include a Core Model 14, and two mechanisms for input and output mapping to the Core Model. The first mechanism is a projected atomic description 15, which maps elements of the Core Model outputs to the user interfaces 11 and the RW effector interface 12, and a decision surface input construction 16 which receives data inputs from the user input interface 11 and the RW sensors input interface 12 and uses an adaptive threshold, NN decision process. This decision surface construction combines these inputs into modification of the atomic descriptions of the Core Model.

The Core Model 14 of FIG. 3 includes elements shown in further detail in FIG. 4. FIG. 4 shows a means of creating an autonomous construction engine of an object space model for this isomorphic knowledge representation which contains N dimensionality of an OD beyond the atomic RW interface attributes, in order to synthesize the complexity of all types of encounters of the engine using non-orthogonal projections with a reduced set of M' RW features. This N-D space OD is represented as point-location populations in a mathematical representation for objects and object-links. These elements include a RW interface to the two input/output elements of FIG. 3 (15, 16) as an OD atomic layer interface 17; and includes an OD-linked node representation 18 in the format set of predicate calculus locators accessing the mass storage device 13 of FIG. 3. Both the RW interface 17 and the locator interface 18 are constructed in a mathematical space of M and M' dimensions, where this dimension (M), in general, is finite. Each of these M-dimensional space interfaces is mapped into an N-dimensional structure representation that can be infinite and extendable from a finite space. This mapping is based on a nonlinear subspace mapping from M'→N (engine 19) and M→N (engine 20) in either direction. The N dimensional space 21 contains the structure of an OD represented in mathematical form. The advantages of this approach over the prior art are that the N-D space constructs a more representative synthesis of the input data for modeled representation.

The construction of the N-dimensional (N-D) object space represents the object attributes as axes in this space of vector $\vec{n}$, where each vector value $n_i$ (for i=1 to N) is the $i^{th}$ attribute value of an object that spans the complete N-D dimension. Most, if not all, objects of the OD used in this space for representation consist of attributes, where i is a subset of the complete space, and hence exist in a smaller representational space or subspace.

As a simplistic example, a 2-D form of an OD is shown in FIG. 5. FIG. 5 shows a means of analyzing the projections of the synthesized OD representation in localized subspaces for efficient metric evaluation as a STM process in the automatic refinement of the OD representation. A set of objects 22, such as the script codes of area and length in the signature of FIG. 2, with attributes graphically represented by a two axis scale, $(x_1, x_2)$, are represented as two classes (such as developed from two user training sessions) by crosses for the first set, and the second set of objects are represented by circles. These discrete sets are based on an object classification construction from previous training sessions or a priori information. These objects have location vectors $\vec{d}_0$ in this space and are point occupations, constructing a discretized set of exemplars similar to those used in NN techniques. The OD space is partially orthogonal, in order that a projection operator, $P_i$ can project a "profile" of the OD onto the $i^{th}$ axis as a density, and is shown in FIG. 5 as a histogram count of the object density in discretized binning of the axis space. OD attribute-projected histograms are shown for both axes as $P_1$, $P_2$. The more common 2-D representation of an OD includes a link between any two objects to show a relationship. In this N-D representation, the link is a second vector $\vec{1}_{mn}$ shown in FIG. 5. While the typical 2-D graphic OD has many links usually shown, for discussion purposes, only one link is shown in FIG. 5. A second type of description, using a similar operator to the projection operator in $P_i$ object density profile histograms, is used to represent link density profile histograms as the occupation of the same discretized space with a link, projected by the link projection operator, $L_i$, and shown as a single example set $L_1$, $L_2$ for the $x_1$ and $x_2$ axis of the one link spanning two grid cells in FIG. 5. Note that the link density histograms occupy discrete grid points that are on the half spacing to the object density grid point spacings. In the simplest representation, the links could be the worldline between the OD exemplars of the atomic features in the speak/sign application. The advantages of this approach over the prior art are that the projected atomic outputs from the LTM tuple-based RDB storage of sub-space operators have a higher fidelity in matching as RW outputs and user accepted representations. These simple mathematical concepts are extended to the general mathematical concept of the invention in the following summary.

In summary, the N-D object space description consists of $o^{th}$ indexed objects (with a total count O, and optional class distinction $C_{\vec{o}}$) located with a location vector $\vec{d}_0$, and $l^{th}$ indexed links (with a total count $L_l$), indexed between $m^{th}$ and $n^{th}$ objects as vector $\vec{1}_{mn}$. Projection operators operating from the complete N-D space to a single 1-D space of axis $x_1$ created histograms of object density ($P_1$ operator created histogram density $P_1(x_1)$ and $P_2$ operator created $P_2(x_2)$) and link density ($L_1$ operator created histogram density $L_1(x_1)$ and $L_2$ created $L_2(x_2)$). These operators can be generalized to constructions which map larger, N-D spaces to subspaces that are M-D, where the example shown in FIG. 5 was for M=1, and N=2. Hence, the general projection operators project to an M-D space as $P_{\vec{m}}$ and $L_{\vec{m}}$, where $\vec{m}$ is the subspace dimensional set (indexed to a total of M count). Note that these dimensions are not necessarily sequential, as for example with M=4, $\vec{m}=\{1,3,5,9\}$, and for M'=4, $\vec{m}=\{1,2,6,8\}$. These generalized mapping functions are shown below for an OD without class distinction ($C_{\vec{o}}=0$), and a multi dimensional histogram density of $\vec{m}$ index.

$$P_{\vec{m}} \equiv P_{\vec{m}}\{\vec{d}_o\} \text{ i for all object classes and } \vec{n} > \vec{m} \quad (1)$$

$$L_{\vec{m}} \equiv L_{\vec{m}}\{\vec{1}_l\} \text{ n for all object classes and } \vec{n} > \vec{m} \quad (2)$$

with l containing linked object pairs (m, n) from space $\vec{n}$, and $P_{\vec{m}}$ and $L_{\vec{m}}$ have histogram density dimension in $\vec{m}$.

One can also form a class filtering operation using NN decision surfaces for the specific $c^{th}$ class of the full class set $C_{\vec{o}}$, where c is a subset index of 6 as:

$$P_{\vec{m}}^c \equiv P_{\vec{m}}^c\{\vec{d}\}_{\vec{n}} \text{ for c subset object classes} \quad (3)$$

$$L_{\vec{m}}^c \equiv L_{\vec{m}}^c\{1_l\}_{\vec{n}} \text{ for c subset object classes} \quad (4)$$

Structure Recognition in N-D Space

The concept formation of the invention constructs an N-Dimensioned space of discretized point occupancy, where the axis defines an object attribute, and the location on that axis defines the attribute value. The object attribute point location is contained in a set of object vectors $\vec{d}_0$. The objects can be contained in groups of similarity as classes, and can be filtered as class object populations from the complete space with subset $C_{\vec{o}}$. The relationships between objects are contained in a second set of vectors, as a vector between the $m^{th}$ and $n^{th}$ object, as link vector $1_{mn}$. The naming of the objects is contained in the class-filtering operator $C_{\vec{o}}$.

The full N-D space is expandable to infinite dimensionality and hence can contain sufficient entropy to handle any application. The "curse of dimensionality" of this entropy is not an issue, because the population of the space is inhomogeneous, and the linking density is more linear, rather than volumetric, such as in worm-shaped occupation densities. The use of a balloon matrix (see Solinsky, "A Method for Compact Information Characterization in a Finite, Discrete Data Set," #JCS/ASD/93-003, Advanced Systems Division, SAIC, La Jolla, Calif. (Apr. 1993)) to order this structure by spanning radiuses is another metric of the finite population of the N-D space entropy. Any single axis of the space can be considered an atomic layer as mappable to the RW input/output functionality (11, 12), or to the mass storage device LTM memory cells (13). These M-spaced cells are mapped to the N≦3 storage device structure using predicate calculus locators.

The invention includes a means of performing subspace mapping to dimension N'<N, and N'≧M' for complexity representation which minimize the OD entropy H, and hyperspace spanning distance $\tilde{D}$ as a function of (N, N', M'). Because the use of subspace projection operators on objects and links is a form of compaction, these subspace histogram projections are observable discriminations for synthesizing the actual OD in its full dimensionality. The statistics of a histogram population density can be modeled from the simplest structure, to the most complex, by the use of the Characteristic Expansion Function (see Kendall and Stuart, *The Advanced Theory of Statistics*, Vol. I-III, MacMillan Pub. Co. (1997)), which is a construction of ordered $A_m$ moments of this population density (orders for m>2 are HOS).

The invention provides a means of utilizing HOS features in representing asymmetry for recognition metrics in the model synthesis which can be expanded to orders beyond $8^{th}$ order, but are claimed operationally successful at $4^{th}$ order. As an example, the first five moments for the M=1 space of FIG. 5 are:

$A_o$=total count of projection density (area $a$) (5)

$A_1$=centroid mean ($\mu$) (6)

$A_2$=centroid area normalized variance or second central moment ($\sigma^2$) (7)

$A_3$=centroid area normalized skewness or third central moment ($m_3$) (8)

$A_4$=centroid area normalized kurtosis or fourth central moment ($m_4$) (9)

and have been shown (see Solinsky et al, "Higher-order Statistical Application in Acoustics with Reference to Nonlinearities in Chaos," Third International Symposium on Signal Processing Applications (HOSSPA 92), Gold Coast, Queensland, Australia (August 1992) and Solinsky et. al, "Signal Analysis of Nonlinear Dynamics and Higher-Order Statistics," SPIE Proceed. 2037 Chaos/Dynamics, San Diego, Calif. 163 (July 1993)) to be useful in well characterizing RW data. A cluster object or link density will eventually project to a Gaussian distribution density described by a centroid mean and variance because of approachment of the central limit theorem for large O or small M for large N. Two such class filtered projections, such as the crosses (user statistic #1) and the circles (user statistic #2) of FIG. 5, can be discriminated by using a classification normalized distance $d_c$ defined as:

$$d_c^2 = (\mu_1 - \mu_2)^2 / \sigma_1 \sigma_2 \quad (10)$$

where $d_c$ is used to locate decision surfaces in the OD, and where the indices of the moment are based on class-filtered projections (from Equations (3) and (4)). Distance classification techniques of the metric in Equation (10) can be expanded to complex formulations including NN forms (see Solinsky et al, "Neural-network Performance Assessment in Sonar Applications," IEEE Conference on Neural Nets in Ocean Engineering Applications, WDC, 1 (August 1991)).

Multimodal distributions of projected densities contain higher-ordered moments (e.g. $A_3$, $A_4$), and can be simplified using a Hermite ordering with coefficients of skewness (normalized $m_3$ as $S \equiv m_3/\sigma^3$), kurtosis (normalized $m_4$ with "excess" Gaussian removal as $K \equiv (\sigma^4) - 3$), and super/hyper skewness/kurtosis to $8^{th}$ order (see Solinsky, "Trispectrum Utilization in Higher Order Statistical Applications," Proceedings of IEEE Conference on HOS, Grenoble, France (1991)—also in *Higher Order Statistics*, J. L. Lacoume Editor, Elsevier Science, Ltd, Netherlands, 339 (1992)). This cumulant statistical ordering with Hermite polynomials is the preferred HOS approach for efficiency.

The identification of finer detailed structure beyond these moment representations can be modeled as hyper-spheroids with asymmetry, first as dumbbells of a single axis of spheroid coupling, and then as multiple axis dumbbells. The amount of asymmetry is contained in the major/minor axis eccentricity $\epsilon_{nm}$ between axis indices n and m, and is a pair wise spatial set. An algebraic geometric modeling can be constructed to represent these structures, and through synthesis the projected densities can be represented as a geometric construction at a higher dimensionality by being projected in a manner to well match the RW population. Mean-root, summed error differences can be used as a simple synthesis feedback metric or "cost function" comparing the RW to the synthesized RW model. A critical component in the development of the structure formulation is contained in the use of Machine Vision (MV) techniques in analyzing these densities as images in 2-D projections. Hence, the invention also utilizes a means of incorporating MV technologies in assessing the symmetry of the N' subspaces. This is an extension of the moment ordering shown previously, but represents structure by features, which can be generalized (see Solinsky, "A Generalized Feature Extraction Approach," VISION '87 Conference, Detroit, Mich., 8-57 (June 1987) and Solinsky, "A Generalized Image Enhancement for Machine Vision Architecture", Ultratech Vision West Conference, Long Beach, Calif., 4-47 (September 1986) and incorporate NN decision processes (see Solinsky, "Machine Vision Tutored Learning Using Artificial Neural Systems Classification," VISION '88 Conference, Detroit, Mich., 1-MS88-490 (June 1988)) for feature detection/construction. It is through this analysis/synthesis process of the N-D representation that the core construction of the STM/LTM mapping can be accomplished with accuracy only limited by the dynamics of the iteration in the comparison metric.

A critical element in the structure recognition is to utilize subspaces of reduced dimension, N', where N'<<N, but N'>3, such as N'=10. Here the projections are made to a set of "images" in reduced dimension. These images are made in the same manner that FIG. 5 showed a 1-D "image" histogram "pixel" density (object/link) from N=2, and "profiles" of these images to 1-D, and a 2-D image pixel density from the "complete" N=3 space. However, the projections would be in the case of N'=10, from an original larger dimension of N, to a set count diversity variable (SD) of (N-N') projections, with each expanded into a lower dimensional space, for a larger total SD number of "image pixel densities", $\rho(\vec{x}_m)$ of (N-N') diversity in subspace dimension, $\vec{m}$.

The expansion of space density count to multiple subspaces of reduced dimension N'<N is shown in FIG. 6. The original example space has a single dimension of N'=N=5, with no diversity (SD=1) as shown in FIG. 6*a*. There are SD=5, N'=4 dimension subspace expansions 27, with different axis diversity as shown in FIG. 6*b*. Each of these N=4 spaces can be expanded 28 into an N'=3 subspace diversity, with total diversity SD=5×4 or shown in FIG. 6*c*. Finally, for N'=2, the subspace diversity (SD=5×4×3) forms image spaces similar to FIG. 5 as shown in the output 29 of FIG. 6*d*.

The last subspace used in the HOS metric calculation of Equations (5) through (9) is shown in FIG. 6e expansion 30, with the highest diversity (SD=5×4×3×2). Thus, in general, one can see that the subspace diversity of reduced dimensionality operates in (N-N')-D space as:

$$SD = (N!)/(N'!) \text{ for } N > N' \quad (11)$$

The entropy of this diversity can be modeled as an approximation to the functional definition in (O, L, D) as:

$$H \approx SD \ln(SD) \quad (12)$$

It can be shown that multi-dimensional moment density construction for dimension m, with m=(N-N') from these subspaces, will completely represent all image pixel constructions, using a weighted construction in the same manner from Equations (5) through (9) with object population pixel density $\rho(\vec{x}_m)$ as:

$$A_0^m = \int \rho(\vec{x}_m) d\vec{x}_m = \text{normalization "area" of dimension m} \quad (13)$$

$$A_1^m = \int \vec{x}_m \rho(\vec{x}_m) d\vec{x}_m A_0^m \quad (14)$$

$$A_2^m = \int (\vec{x}_m - A_1^m)^2 \rho(\vec{x}_m) d\vec{x}_m / A_0^m \quad (15)$$

$$A_3^m = \int (\vec{x}_m - A_1^m)^3 \rho(\vec{x}_m) d\vec{x}_m / A_0^m \quad (16)$$

$$A_4^m = \int (\vec{x}_m - A_1^m)^4 \rho(\vec{x}_m) d\vec{x}_m / A_0^m \quad (17)$$

and the similar Hermite polynomial coefficients $S^m$ and $K^m$ apply. This approach of the invention is a means of capturing the HOS correlation of OD attributes in N' dimensions, when N'≧3, with each HOS order corresponding to an increase in dimensionality for N' subspaces.

Hence, a mathematical process using MV central moment density algorithms is described to construct a large feature set for quantifying multimodal, projected density asymmetries by subspace computation, and a synthesis feedback is used to refine the postulated to real N-D space occupancy fidelity of any accuracy. This projected density of FIG. 5, described by object and link density operators of Equations (1) and (2) are seen in FIG. 5 as image "profile" pixel histograms, where the object pixels are counted at axes locations within grid cells, and the link pixels are counted at axes locations straddling grid cells, or at a ½ grid-cell offset. These histograms can be described by a feature set based on HOS moment expansion of Equations (5) through (9) for the simplistic low dimension (N=2) pixel set of FIG. 5, but can also be represented by the generalized HOS moment expansions of Equations (13) through (17) to fourth order, and are anticipated to not require representation beyond eighth order, but in principal can extend to all orders. This set of HOS becomes the feature set used for deciding upon the accuracy of the OD representation. This approach of the invention provides a means of continuously expanding the OD dimensionality to a dimension of the OD of N≧N' where N can be infinite, based on a fidelity controlling parameter in the synthesis metric decision threshold d parameter. This advances prior art to unique levels of complex modeling.

Thus, a feedback process is constructed within the space to synthesize a dimensional space of order N>M' to represent the observed ordering of the RW interface atomic dimension being limited by the interface observable counts of input/output devices in (11) and (12) of FIG. 3. The N representation space is expanded and populated with random data pixels, and then iterated and compared with the subspace projection using the HOS metrics. The expansion and projection synthesis does not have to be sequential as shown in FIG. 6, nor does it have to use fully orthogonal (i.e. eigenvector decomposition based on Principal Component Analysis) projections. It can utilize partially projected axes orthogonality, as used by Independent Component Analysis techniques (see e.g. Sejnowski and Churchlang, *The Computational Brain*, MIT Press, Cambridge, Mass. (1992) and Lee, *Independent Component Analysis-Theory and Applications*, Klumer Academic Publication, Boston, Mass. (1998)). The HOS features and metric comparisons will still carry all of the discrimination. These projections can also be of fractal order to axes of partial correlation. In this manner, a completely ordered representation space is possible, and extendable to N=∞, with diversity in the subspace, SD, being quite large, yet finite (N-N'≠∞), no matter how complex the atomic layer becomes, where eventually, N'=M' satisfies the RW mapping dimensionality using a variety of N' examples. The simplification of this synthesis construction is contained in a nonlinear and nonsequential search strategy, using the principles of the AC, that optimally discovers the required object- and link-pixel representation for the RW example data at hand.

Neural-Network (NN) Terminal Cycle (TC) Decision Surface Classification

An element in simplifying the N-D space construction and in creating asymmetric projections is to use the class filter in the projection operator as described by Equations (3) and (4) and construct decision surfaces with NN technology. This increases the pixel complexity, from a Central Limit Theorem growth to second-order statistics with no asymmetry metric, to a more complex asymmetric projection. Class construction requires decision surface formation in the M-D space.

Solinsky et al, "Neural-network Performance Assessment in Sonar Applications," IEEE Conference on Neural Nets in Ocean Engineering Applications, WDC, 1 (August 1991) has shown the superiority of NN decision surfaces for class surface constructing over the simple distances formulations used in Equation (10) for bimodal separation. This superiority is due to the nonlinear surface construction over the linear form of Equation (10). NN decision surfaces are able to include surfaces of quadratic with one hidden layer, and hyper-quadratic with two hidden layers (see Lippman, "An Introduction to Computing with Neural Nets," IEEE Acoustics, Speech and Signal Processing Mag. 4 (2), 4-22 (April 1987)), implying that the N-D classification layers would be beyond two hidden layers in complexity. A second means of decision surface construction, which can create separation of highly overlapping class populations, uses a dynamic nonlinear sequence technique (see Griffith, *Mathematical Neurobiology*, Academic Press, NY, N.Y., Chpt. 8 (1971)) of neural biological origins. This approach is also applicable to the application, because it constructs a finite set of random steps in a sequence network of the $i^{th}$ state, using a step operator S (i). Here, the sequence operator is sampling the population density at any level of dimension in subspace N', with the next step sample address (location vector $\vec{S}_n$ for $|\vec{n}|=N'$) derived from the operation of the use of the density value as a seed entry into an address table of random values. By using random noise dithering, with sampling of neighboring densities, this approach can be shown to generate a stable set of addresses after a logarithmic number of iterations (Y) on the dimensionality. This is called a terminal cycle (TC) decision mapping and has been shown to be stable to large dimensionality (N=$10^6$, Y=1253, see the Griffith article).

An important part of a successful TC approach is to populate the empty N-D space grid points with random noise for dithering, such that empty points will still generate a different mapping address each time. In the TC approach to decision surfaces, the classification structure is contained in the sequence of the address jumps, which can be thought of as just the link vectors between the object exemplar population. That is to say, the address sequence in the TC approach becomes the link-list worm hole density, as described in the worldline example. Hence, the inherent ability to represent "knowledge" in this N-D space as a set of objects and links through class filtering has been simplified to class regional object mapping with NN surfaces contained in the weights of each $g^{th}$ hidden layer, and the addresses of the sequence of link vector lists constructs from links $\vec{1}_{mn}$. In essence, the invention has replaced an object/link density moment model with a sequence list of addresses based on class decision surface projections. The final element of the invention is the initiation of the N-D space for a given application, and the method of auto-construction for timely utilization of the N-D knowledge representation. The multimodal separation from projected density asymmetry moment expansions is the critical beginning point of a priori learning for the NN and uses a gas/liquid dynamic model. This model, described next, uses a dynamic stability of continuously changing representations.

Initiation and Dynamic Stability

Referring to FIG. 3, the application of the invention is in obtaining a STM model for M'-D representation of atomic input/outputs from the RW into an N-D OD model. However, it is recognized that the STM will require access to expanding spaces as the application changes its RW inputs, and hence the N-D OD model must be remappable back to LTM storage of M dimensions. This migration of an N-D OD to M-D LTM stored in a mass storage media is based on a continuous M'-D RW input/output stimulation. This LTM mapping is based on a finite set of class location structures of the dynamic address sequence set, and is loaded into/out-of the STM N-D space density representation, using predicate calculus location indexing. Hence, the multiple 2-D structure of the LTM is based on an address sequence for each class (2-D), for each subspace representation. The stability and finite time for LTM memory population access must critically use a subspace construction in order to limit all fidelity levels of searches. Very fast LTM models can be constructed at low level fidelity, and can be refined with the addition of expanded dimensions about the initial representation as described next.

The synthesis of STM and mapping to LTM involves taxonomy of an isomorphic relationship between the N' subspaces to the M≦3 storage space of the LTM media. Each subspace dimension has been shown to be mappable down to N'=2 or 3 spaces, and hence has a direct means of storage in LTM. It also has a means of "tagging" the diversity for each of the SD iterations within this subspace dimension. Hence, the LTM construction taxonomy is considered to be a class sequence in N' representations, with a large linked list of SD diversities. This allows for expansion of subspace fidelity within a single N' representation by adding more "platters" to the LTM. These 2-D physical platters form a linked-list construction. Because this is an object class model, the mapping can be directly controlled by the LTM search algorithms using a predicate calculus representation, and avoids any indirect LTM addressing. This is an important element of the efficiency for the STM synthesis search as the application requires higher fidelity (increasing SD) and higher dimensionality (increasing N') for maturing or stabilizing dynamics of the RW knowledge representation.

A continuous process in the construction of LTM is the construction of class decision surfaces in STM that is efficient for a given level of user fidelity. It is the class filtering process which creates the HOS fidelity in the subspace projections. Here the use of forced choice user decision feedback in an AC are used to quickly identify the subspace for the decision surface construction, and the merging or elimination of other subspace diversities. A model of the classification dynamics combines two previous concepts to retain a dynamic classification for those of a) large regional density representation, such as a liquid region with a parametric density in $\rho(\vec{x}_m)$ encompassing all pixel grid points, and b) singularly-narrow regional density representations, such as a gas region with a discrete set of pixels as a pixel density used to represent $\rho(\vec{x}_m)$ for RW exemplars. This allows for an initiation of the invention by letting N'=M=N for an initial set of RW objects. Exemplars replace the zeroth state value of random values in the STM during initial user interaction.

The system iterates with N>N', with increasing diversity maintained initially by class heuristics being used, either as operator heuristics or user profiles determined from the application. As gas regions become more dense and frequently accessed, the modeled classification migrates to a liquid model, with a gas model used near the decision surfaces. As these regions of liquid modeling become inactive, they migrate back to pixels of recent exemplars as a gas model. This continuous action dynamic through RW stimulation modifies the STM representation, as well as the LTM migration. The use of TC decisions is a means of continuously testing regions of the N-D space for activity or utility without exhaustive search approaches. This becomes a means of implementing the AC formulation for equivocation and uncertainty and hence retains continuous RW user feedback to the utility and applicability of the LTM/STM states. The constructed STM and LTM representation of user(s) knowledge in this dynamically-classed N-D space allows the invention to support a large variety of decision-process applications, where either a chosen input attribute set is compared as a test to decisively match a class, or an object location is projected for an output attribute control to perform a function (e.g. the "Grandmother" neuron example used in recognizing a picture of one's grandmother).

As a further illustration of the invention, the example application of FIG. 2 is described using the RW interface of a personal PDA hand held computer (a machine, such as shown in the FIG. 1 concept) connected via a wireless communication link to a large server via a LAN or the Internet. The PDA displays data output in graphic and alphanumeric form, and receives data input in the form of spoken words and "pen" scratchings on the display surface, for example, using a typical Palm-Pilot-like device. One can also add a location RW device for external non-user information, such as a commercial GPS RF receiver. This constitutes a single application realization of the user and sensor interfaces 11, 12 of FIG. 3.

Inside the PDA is an ASIC, which is based in the invention's technology models and algorithms, and represents the STM contained in elements 14, 15 and 16 of FIG. 3. The Core Model 14 of FIG. 3 is the essence of the algorithms in the ASIC, with the interface mapping 16 and projection 15 algorithms utilizing computational storage contained in the ASIC and mass storage devices. The link to the mass storage device 13 is the LTM of FIG. 3, and is accessed using simplistic predicate calculus commands as messages over the PDA wireless communication. This mass storage device can be a server, which returns RDB types of specific LTM subspace populations for rework by the STM. Note that here the RDB accessing of LTM avoids previously cited problems in the use of SQL for RDB usage. This particular application is shown in FIG. 7 for user authentication and identification in the e-presence application of FIG. 2.

The utilization of this application device is as follows:
1) The LTM 31 is used as a remote server through a telecommunication interface link (i.e. telecom 36 in FIG. 7 to support the STM 32), limited by the ASIC resources of the STM realization, through dynamic, but frequent and discontinuous access to a RDB storage using a predicate calculus algorithm. There, previously captured profiles of the user's behavior derived from preferences, correlated events, etc. (e.g. e-presence signature) are stored.
2) The graphic user interface 33 uses a display of characters on the PDA screen in a sequential, and rapid manner, with random location and value, and having the display time limited to forced-choice cognitive science values (e.g. 5 per second).
3) The atomic feature input space of M'=10 is made with commercial voice characterization (e.g. LPC) sampled at forced choice response times (e.g. 5 per second), and sequential handwritten features based on MV analysis of the pen scrollings at a similar forced choice sampling (e.g. 5 per second on the temporal GUI input sequence). The dimensions of this input representation could be based for example on six LPC features for voice input and four MV features for hand written input, for a six second session of user ID input verification (37) comprising a worldline identity in the N=10 correlation space.
4) User ID authentication of the e-presence could be expanded to include location-dependent ID for further dimensional correlation, and begins with a location-dependent (GPS 34) selection (12 of FIG. 3) of LTM space exemplars (13 of FIG. 3). The user is notified graphically (33, 15 of FIG. 3) to sign one's name with the pen, while simultaneously speaking the same user name. The STM (32, 14 of FIG. 3) clocks (35) the sampling of the input data to a set of 30 (6 sec/200 msec) sequential input feature vectors of atomic attributes. These vectors construct a linked set of sequential vector subspaces (N'$\geqq$10) for a diversity of potentially large dimensions (SD$\geqq$30). Based on Equation (21), the STM representation could be as large as N$\geqq$12 for a (N-N')=3 limitation at the atomic level. However, previous training of the LTM by the user (a few examples), would construct class representation of this diversity to potentially only a few subspaces, varying with user location.
5) An adaptive threshold d (set by the designed Pc level) in the test user ID example (of name signing with simultaneously speaking the name as speak/sign) is made in an N=10 correlation space, which has exponentially increasing reliability to simple N=2 space correlation. In fact, it is the proper sequence and user action, which creates a single link of correlation structure of the exemplars as a worldline to which the test sample is compared with in LTM training storage, much as is done in the TC representation. This feature input concurrency is an important element of achieving the large Pc values.
6) Upon "correct" user ID recognition, the PDA further verifies the user ID through a second test, by displaying a sequence of letter and numbers for six seconds in a forced choice mode clocking (38), with the user verbally stating each number or letter. Again, a subspace of the (N'$\geqq$10) atomic input features is used (without the pen inputs) for recognition, such as for N'=6 from before, or also could be expanded to N'>10 if higher fidelity is required.

This application is a simplistic representation of the STM/LTM partitioning and user/sensor interfaces, with the Core Model contained in an ASIC. The ASIC algorithm operates using a representation of the subspace atomic inputs, expanded by synthesis to create recognition fidelity for class decisions. This expansion adds subspaces and classes, with dynamic control of recognition within the invention technology application product provider, who desires the user ID testing results. This control limits the extendibility of the Core Model algorithm in HOS feature order (fourth or more of Equation (13) through (17)) and in diversity computation order (m of Equation (13) through (17)).

If N' is limited to a higher dimension through optimum synthesis, then the STM represents the recognition correlation very quickly as an n=N' spatial feature set. Non-optimum implementation of the Core Model will result in longer convergence times of n<N' and more extensive diversity.

The invention is applicable to all problems in complexity, such as exemplar population and attribute normalizations, which require extensions to N>3 spaces for representation, and can be shown to be extendable to N=$\infty$ without an infinite time required for synthesis, due to the linear nature of the TC and worldline approach. This is because the representation is limited in fidelity and model hyperspaces with linear growth metrics, and hence always deals with a collection of subspace decision surfaces based on class projections, in order to achieve a higher order correlation analysis. The use of heuristics and user profiles allows for the sharing among a set of users of LTM spaces to more rapidly initiate the system use, and reduce user training time for forming the exemplar population in a minimum time.

Finally, because of the dynamic user interaction provided by the liquid/gas model of class decision surfaces, (which allow for the synthesis process to proceed into a rapid convergence), the invention can change with all types of variations based on the RW environment from the user and sensors of the input, and the control of this environment is monitored by the forced-choice sampling of the output effects.

Example Method and Systems for Applications

An example method is shown in a flow chart in FIG. 8. The user and/or RW sensor inputs begin to stimulate and a response to this stimuli is constructed (40) by first capturing this stimuli (40) and storing it, and successive stimuli (41) into the STM element (42). Here a synthesis of the OD model construction is performed and the model abstraction is stored (43) into LTM (44). During synthesis (42), or as a result of new stimuli (39), the LTM (44) is used to retrieve the synthesized model (45) and either a new model is synthesized as a dynamic to further stimuli (42, 39, 40) or an output response is generated (46) and drives the user and/or RW effector outputs (47). The dynamic synthesis can also request new user and/or RW input (39) as requested by the synthesis (46) of the STM (42). Specific functions of this method embodied in the text are listed in FIG. 8.

An example system which creates the implementation of this method of FIG. 8 is shown in FIG. 9 as a generic block diagram. The user and/or RW input interface 48 is based on commercial standards and components, and interfaces to a data capture device 49 embodied as either a process or specialized board, an ASIC, or a net-list which provides the STM component 50 with input data as a stimuli. The STM utilizes a floating-point processor component with memory to scale the input data values to fixed point storage for use in the model synthesis process. The model synthesis occurs in the STM components 50 which execute fixed point processors and data value arithmetic operations, driven by a processor and memory. The STM controls this synthesis by using a control processor operating on the synthesis parameters and creating testing decision outcomes that are stored in memory. This control processor uses a synthesis processor code component that orchestrates the synthesis process and stores and retrieves results with a mass storage LTM device through a processor, memory, and communication device 54, with the LTM becoming as an example, a commercial RDB system 51. The results of the dynamic model synthesis and control process, based on the input stimuli 48 are outputted through a data generator device 52 which conveys output data for display for the user and/or used by the RW output effectors 53. These generic components of FIG. 9 can be embodied in a system of commercial devices and components, a processor executing software with external input/output devices and mass storage devices, an ASIC device designed with components of input/output interfaces to other commercial suppliers, or as a netlist for use by other commercial suppliers which is incorporated into specific application hardware product systems.

Each of the documents listed above is incorporated herein by reference.

While particular embodiments of the present invention have been described and illustrated, it should be understood that the invention is not limited thereto because modifications may be made by persons skilled in the art. The present application contemplates any and all modifications that fall within the spirit and scope of the underlying invention discloses and claimed herein.

I claim:

1. A method of generating outputs in response to real world stimulation comprising:
    capturing two or more simultaneous user inputs that are responsive to training stimulation;
    synthesizing the captured user inputs;
    generating a user memory model representation of the synthesized user inputs, the model comprising objects and object links in a partially orthogonal N-dimensional object space;
    storing the generated model; and
    using the stored model to generate signals for controlling an effector or for output by a user interface in response to real-world stimulation.

2. The method according to claim 1, further comprising:
    using a forced choice interaction to generate one or more additional user inputs;
    capturing the additional user inputs; and
    incorporating the additional user inputs into the model.

3. The method according to claim 1, wherein the model comprises a worldline of linked object diagram exemplars.

4. The method according to claim 1, wherein
    the real world stimulation comprises simultaneous user inputs that are compared to the stored model, and
    the output signals are based on the results of the comparison.

5. The method according to claim 1, wherein the method is performed at least partly in accordance with computer-executable instructions stored on a computer-readable medium.

6. The method according to claim 1, wherein the method is performed at least partly by a hardware processing engine.

7. The method according to claim 1, wherein the method is performed by at least partly by an application specific integrated circuit.

8. The method according to claim 1, wherein the method is performed at least partly by a netlist integrated into other integrated circuits.

9. A method of generating outputs in response to control command stimulation comprising:
    capturing two or more simultaneous user inputs that are responsive to training stimulation;
    synthesizing the captured user inputs;
    generating a user memory model representation of the synthesized user inputs, the model comprising objects and object links in a partially orthogonal N-dimensional object space;
    storing the generated model; and
    using the stored model to generate signals for controlling an effector or for output by a user interface in response to control command stimulation.

10. The method according to claim 9, further comprising:
    using forced choice interaction to generate one or more additional users inputs;
    capturing the additional user inputs; and
    incorporating the additional user inputs into the model.

11. The method according to claim 9, wherein the model comprises a worldline of linked object diagram exemplars.

12. The method according to claim 9, wherein
    the real world stimulation comprises simultaneous user inputs that are compared to the stored model, and
    the output signals are based on the results of the comparison.

13. The method according to claim 9, wherein the method is performed at least partly in accordance with computer-executable instructions stored on a computer-readable medium.

14. The method according to claim 9, wherein the method is performed at least partly by a hardware processing engine.

15. The method according to claim 9, wherein the method is performed at least partly by an application specific integrated circuit.

16. The method according to claim 9, wherein the method is performed at least partly by a netlist integrated into other integrated circuits.

17. A system for generating outputs in response to real world stimulation comprising:
    input capture circuitry that captures two or more simultaneous user inputs that are responsive to training stimulation;
    processing circuitry for synthesizing the captured user inputs and generating a user memory model representation of the synthesized user inputs, the model comprising objects and object links in a partially orthogonal N-dimensional object space; and
    a memory that stores the generated model; and
    an output generator that uses the stored model to generate signals for controlling an effector or for output by a user interface in response to real world stimulation.

18. The system according to claim 17, wherein the input capture circuitry further captures one or more additional user inputs generated from a forced choice interaction and the additional user inputs are incorporated into the model.

19. The system according to claim 17, wherein the model comprises a worldline of linked object diagram exemplars.

20. The system according to claim 17, wherein the real world stimulation comprises simultaneous user inputs that are compared to the stored model, and the output signals are based on the results of the comparison.

21. The system according to claim 17, wherein at least part of said system is implemented in a computer software program.

22. The system according to claim 17, wherein at least part of said system is implemented as a hardware processing engine.

23. The system according to claim 17, wherein at least part of said system is implemented as an application specific integrated circuit.

24. The system according to claim 17, wherein at least part of said system is implemented as a net list integrated into other integrated circuits.

25. A system for generating outputs in response to control command stimulation comprising:
   input capture circuitry that captures two or more simultaneous user inputs that are responsive to training stimulation;
   processing circuitry for synthesizing the captured user inputs and generating a user memory model representation of the synthesized user inputs, the model comprising objects and object links in a partially orthogonal N-dimensional object space; and
   a memory that stores the generated model; and
   an output generator that uses the stored model to generate signals for controlling an effector or for output by a user interface in response to control command stimulation.

26. The system according to claim 25, wherein the input capture circuitry further captures one or more additional inputs generated from a forced choice interaction and the additional inputs are incorporated into the model.

27. The system according to claim 25, wherein the model comprises a worldline of linked object diagram exemplars.

28. The system according to claim 25, wherein the real world stimulation comprises simultaneous inputs that are compared to the stored model, and the output signals are based on the results of the comparison.

29. The system according to claim 25, wherein at least part of said system is implemented in a computer software program.

30. The system according to claim 25, wherein at least part of said system is implemented as a hardware processing engine.

31. The system according to claim 25, wherein at least part of said system is implemented as an application specific integrated circuit.

32. The system according to claim 25, wherein at least part of said system is implemented as a net list integrated into other integrated circuits.

33. A method of generating outputs in response to real world stimulation comprising:
   capturing two or more simultaneous user inputs that are responsive to training stimulation;
   synthesizing the captured user inputs through a dynamic, user memory model-based response generation from the captured user inputs with correlated congruence to two or more data input channels;
   storing the model representation of the synthesis generation as mapped into a partially orthogonal N-dimensional representation; and
   using the stored model to generate signals for controlling an effector or for output by a user interface in response to real world stimulation through temporally sensitive similarity matching.

34. The method according to claim 33, further comprising:
   using a forced choice interaction of dynamic temporal events to generate one or more additional simultaneous user inputs, which are physically/mentally linked pattern responses;
   capturing the additional user inputs; and
   incorporating the additional user inputs into the model.

35. A method of generating outputs in response to real world stimulation comprising:
   receiving two or more simultaneous inputs supplied by a user in response to training stimulation;
   generating a model comprising objects and object links in a partially orthogonal N-dimensional object space, the model representing a synthesis of the simultaneous user inputs;
   mapping the N-dimensional object space to one or more M-dimensional sub-spaces to compare the model representing the synthesis of the simultaneous user inputs to subsequently received simultaneous user inputs; and
   generating signals for controlling an effector or for output by a user interface in response to the comparing.

36. The method according to claim 35, wherein N>3.

37. The method according to claim 35, wherein the N-dimensional space is mapped to the one or more M-dimensional sub-spaces using subspace projection operators.

38. The method according to claim 37, wherein the subspace projection operators project densities to the M-dimensional space.

39. The method according to claim 38, wherein the subspace projection operators project the densities onto axes of the object space model.

40. The method according to claim 38, wherein the subspace projection operators include subspace projection operators for obtaining attribute densities.

41. The method according to claim 38, wherein the subspace projection operators include subspace projection operators for obtaining object link densities.

42. The method according to claim 35, wherein the object links comprise a worldline connecting the objects.

43. The method according to claim 35, wherein the subsequently received simultaneous user inputs are provided in response to a forced choice interaction with the user.

44. The method according to claim 35, wherein the method is performed at least partly in accordance with computer-executable instructions stored on a storage medium.

45. The method according to claim 35, wherein the method is performed at least partly by a hardware processing engine.

46. The method according to claim 35, wherein the method is performed at least partly by an application specific integrated circuit.

47. The method according to claim 35, wherein the method is performed at least partly by a netlist integrated into other integrated circuits.

48. The method according to claim 35, wherein the output signals comprise display signals.

49. The method according to claim 35, wherein the output signals comprise control signals.

50. A method of generating outputs in response to real world stimulation comprising:
   receiving two or more simultaneous inputs supplied by a user in response to training stimulation;
   generating a model comprising objects and object links in an N-dimensional object space, the model representing a synthesis of the simultaneous user inputs, wherein the objects include objects of two or more different object classes;
   mapping the N-dimensional object space to one or more M-dimensional sub-spaces to compare the model representing the synthesis of the simultaneous user inputs to subsequently received simultaneous user inputs; and
   generating signals for controlling an effector or for output by a user interface in response to the comparing.

51. The method according to claim 50, wherein the object links comprise worldlines each connecting the objects of a respective one of the different classes.

52. The method according to claim 50, wherein the different object classes correspond to different user training sessions.

53. A system for generating outputs in response to real world stimulation comprising:
- inputs for receiving two or more simultaneous inputs supplied by a user in response to training stimulation;
- storage for storing a model comprising objects and object links in a partially orthogonal N-dimensional object space, the model representing a synthesis of the simultaneous user inputs;
- a processing system for mapping the N-dimensional object space to one or more M-dimensional sub-spaces to compare the model representing the synthesis of the simultaneous user inputs to subsequently received simultaneous user inputs; and
- outputs for outputting signals for controlling an effector or for output by a user interface based on the comparing.

54. The system according to claim 53, wherein the output signals comprise display signals.

55. The system according to claim 53, wherein the output signals comprise control signals.

56. A system for generating outputs in response to real world stimulation comprising:
- inputs for receiving two or more simultaneous inputs supplied by a user in response to training stimulation;
- storage for storing a model comprising objects and object links in an N-dimensional object space, the model representing a synthesis of the simultaneous user inputs, wherein the objects include objects of two or more different object classes;
- a processing system for mapping the N-dimensional object space to one or more M-dimensional sub-spaces to compare the model representing the synthesis of the simultaneous user inputs to subsequently received simultaneous user inputs; and
- outputs for outputting signals for controlling an effector or for output by a user interface based on the comparing.

57. The system according to claim 56, wherein the output signals comprise display signals.

58. The system according to claim 56, wherein the output signals comprise control signals.

59. A method of generating outputs in response to real world stimulation comprising:
- capturing two or more simultaneous user inputs that are responsive to training stimulation;
- synthesizing the captured user inputs;
- generating a user memory model representation of the synthesized user inputs, the model comprising objects and object links in a partially orthogonal N-dimensional object space;
- storing the generated model; and
- using the stored model to generate display signals in response to real-world stimulation.

* * * * *